US009802457B2

(12) United States Patent
Yamazaki et al.

(10) Patent No.: US 9,802,457 B2
(45) Date of Patent: Oct. 31, 2017

(54) VIBRATION DAMPING DEVICE FOR A VEHICLE BODY

(71) Applicant: YAMAHA HATSUDOKI KABUSHIKI KAISHA, Iwata-shi, Shizuoka (JP)

(72) Inventors: Yutaka Yamazaki, Shizuoka (JP); Toyoji Harada, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 15/110,163

(22) PCT Filed: Dec. 5, 2014

(86) PCT No.: PCT/JP2014/082227
§ 371 (c)(1),
(2) Date: Jul. 7, 2016

(87) PCT Pub. No.: WO2015/104929
PCT Pub. Date: Jul. 16, 2015

(65) Prior Publication Data
US 2016/0339758 A1 Nov. 24, 2016

(30) Foreign Application Priority Data
Jan. 9, 2014 (JP) ................. 2014-002160

(51) Int. Cl.
B60G 21/073 (2006.01)
F16F 9/06 (2006.01)
(Continued)

(52) U.S. Cl.
CPC ............ B60G 21/073 (2013.01); F16F 9/061 (2013.01); F16F 9/19 (2013.01); F16F 9/44 (2013.01); F16F 9/446 (2013.01); B60G 2206/01 (2013.01)

(58) Field of Classification Search
CPC .... F16F 9/19; F16F 9/446; F16F 9/061; F16F 9/44; B60G 21/073; B60G 2206/01
See application file for complete search history.

(56) References Cited

U.S. PATENT DOCUMENTS 3,103,993 A * 9/1963 Gies .......................... F16F 9/42
188/274
5,810,128 A 9/1998 Eriksson et al.
(Continued)

FOREIGN PATENT DOCUMENTS

DE 102011075792 B3 * 11/2012 .............. F16F 9/446
EP 1 403 549 A2 3/2004
(Continued)

OTHER PUBLICATIONS

Official Communication issued in European Patent Application No. 14877577.8, dated Dec. 22, 2016.
(Continued)

Primary Examiner — James A English
(74) Attorney, Agent, or Firm — Keating and Bennett, LLP

(57) ABSTRACT

A damping force change mechanism includes an on-off valve located in a through hole of a piston rod. The on-off valve opens/closes a third hydraulic oil passage that allows a first oil chamber on a free piston side and a second oil chamber between a first piston and a second piston to communicate with each other. The on-off valve includes an expanded diameter portion in the first oil chamber extending outward in the radial direction. The expanded diameter portion faces the entire opening edge of the through hole and tightly contacts an end surface of the piston rod. The magnitude of a damping force is easily changed, and a damping force characteristic in a case in which the damping force is large is stabilized.

10 Claims, 18 Drawing Sheets

(51) Int. Cl.
  *F16F 9/44* (2006.01)
  *F16F 9/19* (2006.01)

(56) References Cited

U.S. PATENT DOCUMENTS

| | | | |
|---|---|---|---|
| 7,975,814 B2* | 7/2011 | Soderdahl | F15B 1/021 |
| | | | 188/317 |
| 2002/0056969 A1 | 5/2002 | Sawai et al. | |
| 2004/0061266 A1 | 4/2004 | Riel et al. | |
| 2016/0281815 A1* | 9/2016 | Teraoka | F16F 9/5126 |
| 2017/0058987 A1* | 3/2017 | Nakano | F16F 9/34 |
| 2017/0120716 A1* | 5/2017 | Sakai | B60G 13/08 |

FOREIGN PATENT DOCUMENTS

| | | |
|---|---|---|
| FR | 2 594 756 A1 | 8/1987 |
| GB | 2 187 346 A | 9/1987 |
| JP | 2-168038 A | 6/1990 |
| JP | 03-043138 U | 4/1991 |
| JP | 5-178058 A | 7/1993 |
| JP | 8-312710 A | 11/1996 |
| JP | 10-331898 A | 12/1998 |
| JP | 2002-181114 A | 6/2002 |
| JP | 4627389 B2 | 2/2011 |

OTHER PUBLICATIONS

Official Communication issued in International Patent Application No. PCT/JP2014/082227, dated Jan. 13, 2015.

* cited by examiner

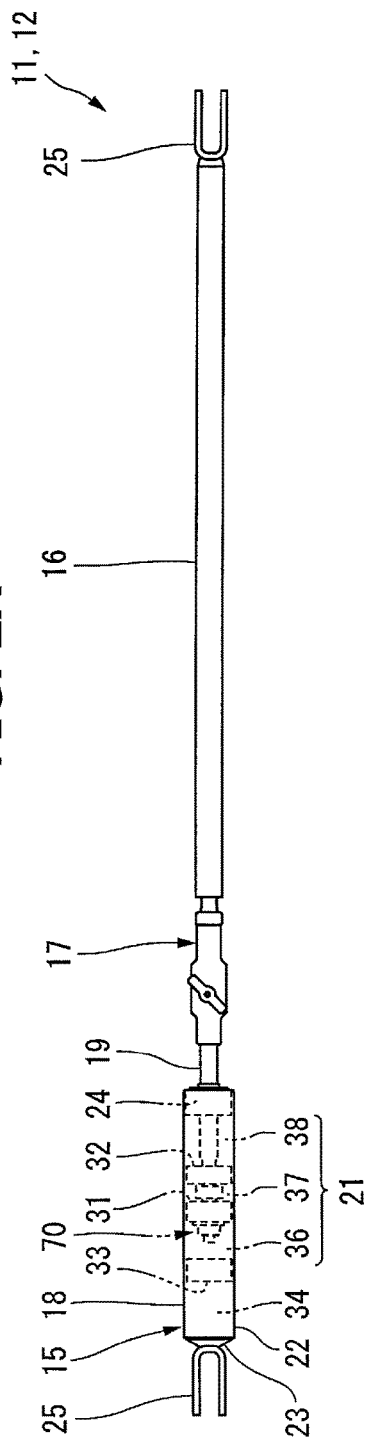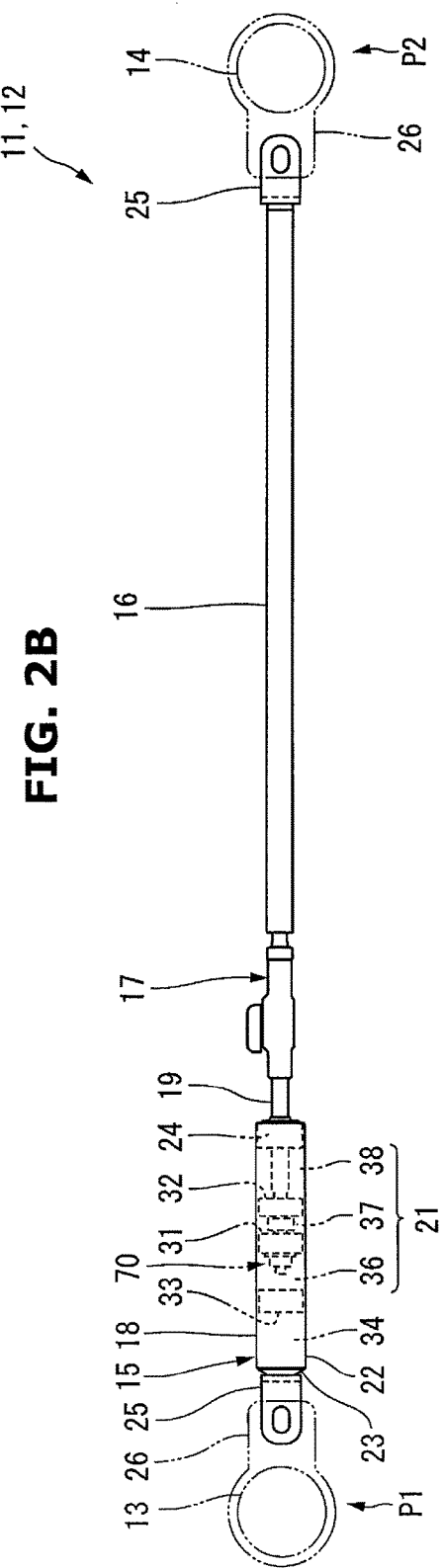

VIBRATION DAMPING DEVICE FOR A VEHICLE BODY

BACKGROUND OF THE INVENTION

1. Field of the Invention

The present invention relates to a vibration damping device for a vehicle body that damps vibrations of a vehicle body and improves the riding comfort of the vehicle.

2. Description of the Related Art

The body of a vehicle is known to be slightly elastically deformed by an external force applied at the time of traveling and, because of the elastic deformation, generate a vibration having a small amplitude. The amplitude of the vibration is several ten μm to about 1 to 2 mm. The external force that causes the elastic deformation is applied from the engine or the wheels running on an uneven road surface to the vehicle body.

Conventionally, to damp a vehicle body vibration of this type, a vibration damping device is mounted in a vehicle body in some cases. As a conventional vibration damping device for a vehicle body, for example, Japanese Patent No. 4627389 discloses a hydraulic device.

The hydraulic vibration damping device for a vehicle body disclosed in Japanese Patent No. 4627389 includes a hydraulic cylinder portion configured to generate a damping force and a connecting rod portion coupled with a piston rod projecting from the hydraulic cylinder portion. The hydraulic cylinder portion is mounted at, for example, one end of the vehicle body in the side-to-side direction. The distal end of the connecting rod portion is mounted on, for example, the other end of the vehicle body in the side-to-side direction.

The hydraulic cylinder portion includes a hydraulic cylinder, a piston and a free piston that are movably fitted in the hydraulic cylinder, and a piston rod connected to the piston.

The piston divides a hydraulic oil chamber in the hydraulic cylinder into two oil chambers. The piston is provided with a hydraulic oil passage that allows the two oil chambers to communicate with each other, and a check valve to open/close the hydraulic oil passage and generate a damping force. The piston rod extends through one oil chamber and projects outside the hydraulic cylinder.

The free piston divides the inside of the hydraulic cylinder into a hydraulic oil chamber and a gas chamber filled with a high pressure gas. The hydraulic oil in the hydraulic oil chamber is always pressurized by the high pressure gas.

The hydraulic cylinder portion itself is directly fixed to one end of the vehicle body in the side-to-side direction or the back-and-forth direction. On the other hand, the piston is fixed to the other end of the vehicle body in the side-to-side direction or the back-and-forth direction via the piston rod and the connecting rod.

In the conventional vibration damping device for a vehicle body, the piston and the hydraulic cylinder relatively move due to the vibration of the vehicle body, and the hydraulic oil passes through the check valve of the piston to generate a damping force.

In this vibration damping device for a vehicle body, to change the magnitude of the generated damping force, the check valve needs to be exchanged.

As a conventional hydraulic buffer capable of changing the damping force, for example, Japanese Patent Laid-Open No. 10-331898 describes a shock absorber.

The shock absorber disclosed in Japanese Patent Laid-Open No. 10-331898 includes a cylinder, a piston rod inserted into one end of the cylinder, and a first piston and a second piston that are mounted on the piston rod. The first piston is fixed to the piston rod on the other end side of the cylinder. The second piston is fixed on the piston rod on one end side of the cylinder with respect to the first piston. The first piston and the second piston divide the inside of the cylinder into three oil chambers. The three oil chambers include a first oil chamber between the first piston and the other end of the cylinder, a second oil chamber between the two pistons, and a third oil chamber between the second piston and the one end of the cylinder.

Each of the two pistons is provided with a leaf valve that generates a damping force. The leaf valve is provided in the hydraulic oil passage extending through the piston. The leaf valve closes when the pressure difference between the two oil chambers divided by the piston is equal to or smaller than a predetermined threshold, and opens when the pressure difference exceeds the threshold.

A hydraulic oil passage that allows the second oil chamber and the third oil chamber to communicate with each other is provided in the piston rod. A needle valve that defines an adjustable valve is provided along the axis of the piston rod. The needle valve changes the sectional area of the hydraulic oil passage due to a tapered portion fitted in the hydraulic oil passage in the piston rod. The needle value is integral with an operation rod extending up to the projecting end of the piston rod. The operation rod threadably engages with the piston rod.

In this shock absorber, when the operation rod is rotated with respect to the piston rod to screw or loosen the threadably engaging portion, the aperture ratio of the needle valve continuously changes. This makes it possible to arbitrarily adjust the magnitude of the generated damping force in an onboard state.

SUMMARY OF THE INVENTION

The inventor of the present invention considered providing a damping force change mechanism capable of easily changing the damping force in an onboard state in the vibration damping device for a vehicle body as disclosed in Japanese Patent No. 4627389.

To implement this, for example, the damping force change mechanism described in Japanese Patent Laid-Open No. 10-331898 may be provided in the vibration damping device for a vehicle body.

However, when the damping force change mechanism described in Japanese Patent Laid-Open No. 10-331898 is applied to the vibration damping device for a vehicle body described in Japanese Patent No. 4627389, the following problem arises in a case in which the needle valve is set in a totally closed state to obtain a large damping force.

The threadably engaging portion of the needle valve is manually tightened or loosened. For this reason, when totally closing the needle valve, the seal pressure of the seal portion may vary based on how hard an operator tightens the needle valve. If the seal pressure is low, the hydraulic oil may leak from the gap between a through hole and the needle valve even if the needle valve is totally closed. In particular, when the hydraulic oil is pressurized by a high pressure gas, the needle valve is always biased in the opening direction, and the risk of leakage is higher. Even slight leakage of the hydraulic oil results in a change in the damping force characteristic. That is, if the damping force change mechanism described in Japanese Patent Laid-Open No. 10-331898 is applied to the vibration damping device for a vehicle body disclosed in Japanese Patent No. 4627389, the damping force characteristic may vary when closing the needle valve.

Preferred embodiments of the present invention provide a vibration damping device for a vehicle body that easily changes the magnitude of a damping force and stabilizes the damping force characteristic in a case in which the damping force is large.

According to a preferred embodiment of the present invention, a vibration damping device for a vehicle body includes a cylinder including one end which is supported at a predetermined first mounting position of a vehicle body, a piston rod slidably extending through the other end of the cylinder, and including one end which is inserted into the cylinder and the other end which is supported at a predetermined second mounting position of the vehicle body, a first piston through which the piston rod extends, the first piston fixed to the one end of the piston rod and slidably fitted in the cylinder, a second piston through which the piston rod extends, the second piston fixed on the piston rod between the first piston and the other end of the cylinder and slidably fitted in the cylinder, a free piston slidably fitted between the first piston and the one end of the cylinder, a gas chamber between the free piston and the one end of the cylinder and filled with a gas of a predetermined pressure, a first oil chamber between the free piston and the first piston and filled with a hydraulic oil, a second oil chamber between the first piston and the second piston and filled with the hydraulic oil, a third oil chamber between the second piston and the other end of the cylinder and filled with the hydraulic oil, a first hydraulic oil passage provided in the first piston that allows the first oil chamber and the second oil chamber to communicate with each other, a second hydraulic oil passage provided in the second piston that allows the second oil chamber and the third oil chamber to communicate with each other, a first restrictor provided in the first hydraulic oil passage, a second restrictor provided in the second hydraulic oil passage, and a damping force change mechanism provided in the piston rod that selectively allows the first oil chamber and the second oil chamber to communicate with each other, wherein the damping force change mechanism includes a through hole opening in an end surface at the one end of the piston rod and extending toward the other end of the piston rod, a communicating hole that allows the through hole and the second oil chamber to communicate with each other, a third hydraulic oil passage extending from the through hole to the communicating hole that allows the first oil chamber and the second oil chamber to communicate with each other, an on-off valve movably fitted in the through hole, the on-off valve that defines a fully opened state by moving in a predetermined first direction so as to open the third hydraulic oil passage, and a fully closed state by moving in a second direction opposite to the first direction so as to close the third hydraulic oil passage, and an operation rod inserted into the piston rod on a side of the other end of the piston rod with respect to the on-off valve in the through hole, the operation rod being movable in the first direction and the second direction so as to determine a moving direction of the on-off valve, wherein the on-off valve includes an expanded diameter portion projecting from the through hole into the first oil chamber and extending outward in a radial direction of the piston rod, and the expanded diameter portion faces an entire opening edge of the through hole and tightly contacts the end surface of the piston rod.

In the present preferred embodiment, when the first piston and the second piston move in the axial direction with respect to the cylinder in the fully closed state of the on-off valve, the hydraulic oil passes through the first restrictor and the second restrictor. In this case, the magnitude of a damping force generated by the vibration damping device for a vehicle body is the sum of the magnitude of a damping force generated when the hydraulic oil passes through the first restrictor and the magnitude of a damping force generated when the hydraulic oil passes through the second restrictor.

On the other hand, in the fully opened state of the on-off valve, the third hydraulic oil passage that allows the first oil chamber and the second oil chamber to communicate with each other is provided in the piston rod. When the first piston and the second piston move in the axial direction with respect to the cylinder in this state, the hydraulic oil passes through the third hydraulic oil passage in place of the first restrictor and also passes through the second restrictor. In this case, a damping force is generated when the hydraulic oil passes through the second restrictor. That is, the magnitude of the damping force in this case is smaller than the magnitude of the damping force in the fully closed state of the on-off valve.

That is, a relatively large damping force is generated when the on-off valve is closed, and a relatively small damping force is generated when the on-off valve is opened.

The hydraulic oil in the first oil chamber and the second oil chamber is pressurized by the gas via the free piston. For this reason, the oil pressure in the first oil chamber and that in the second oil chamber act on the on-off valve. The on-off valve is pressed in the axial direction by a force corresponding to the difference between the pressure receiving area on the first oil chamber side and the pressure receiving area on the second oil chamber side. The pressure receiving area on the second oil chamber side is smaller than the pressure receiving area on the first oil chamber side by an area corresponding to the shaft portion fitted in the through hole of the on-off valve. That is, the on-off valve is pressed from one end side of the piston rod to the other end side together with the operation rod whose other end is opened to the atmosphere. When the on-off valve is pressed by the oil pressure, and the expanded diameter portion tightly contacts the end surface of the piston rod, the hydraulic oil is prevented from leaking through the portion between the on-off valve and the through hole. Hence, the damping force characteristic stabilizes in a state in which the on-off valve closes, and a large damping force is generated.

Hence, according to preferred embodiments of the present invention, it is possible to provide a vibration damping device for a vehicle body capable that easily changes the magnitude of a damping force and stabilizes the damping force characteristic in a case in which the damping force is large.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a plan view showing the detailed arrangement of the vibration damping device for a vehicle body according to the first preferred embodiment of the present invention.

FIG. 2B is a side view showing the detailed arrangement of the vibration damping device for a vehicle body according to the first preferred embodiment of the present invention.

DETAILED DESCRIPTION OF THE PREFERRED EMBODIMENTS

First Preferred Embodiment

A vibration damping device for a vehicle body according to a preferred embodiment of the present invention will now be described in detail with reference to FIGS. 1 to 10.

Figure 1:
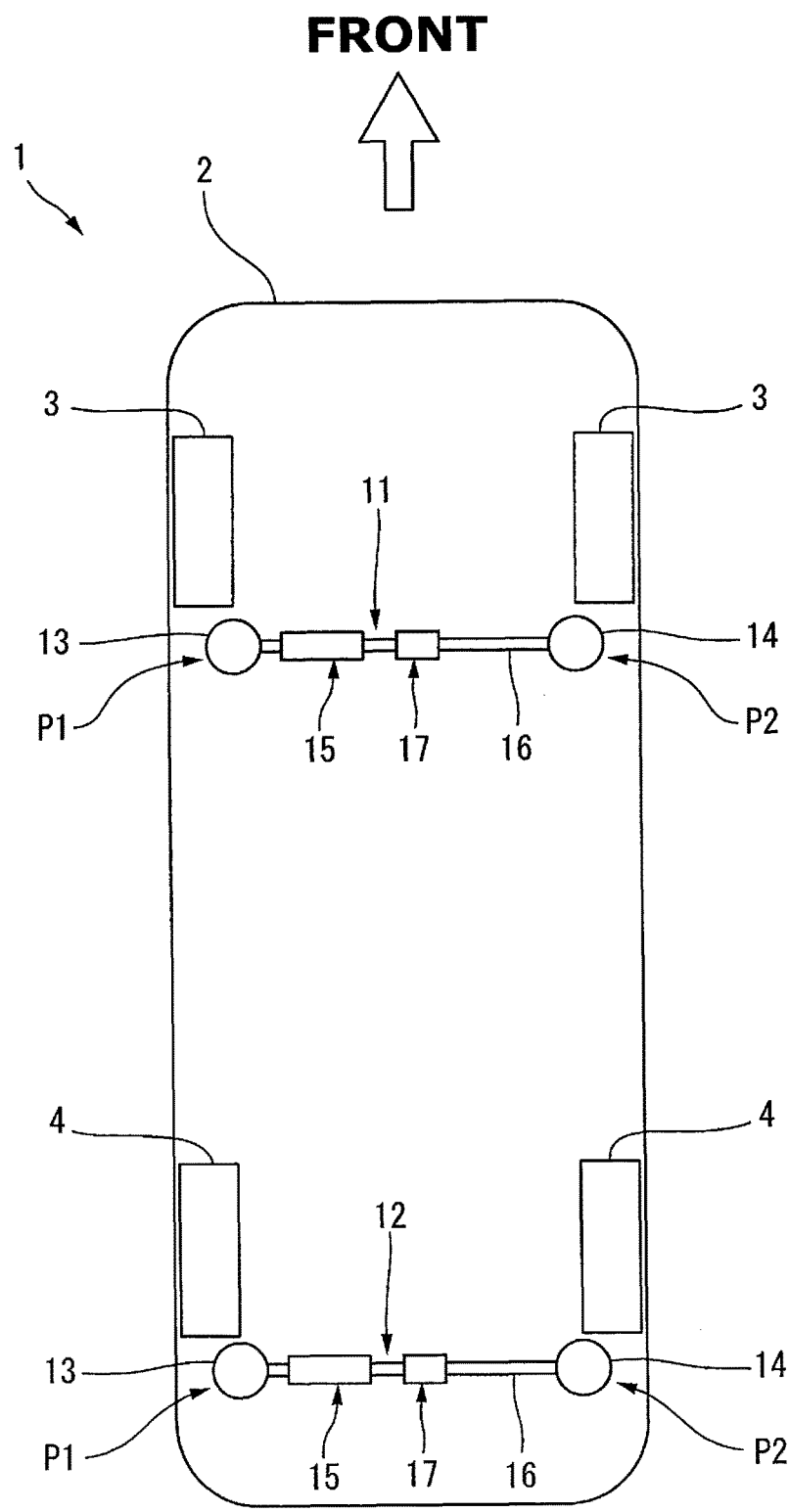
FIG. 1 is a plan view showing the schematic arrangement of a vibration damping device for a vehicle body according to a first preferred embodiment of the present invention, which illustrates a state in which the vibration damping device for a vehicle body is mounted in a vehicle body.

A vehicle 1 shown in FIG. 1 is, for example, a passenger car that an occupant (not shown) drives to travel. A vehicle body 2 of the vehicle 1 is provided with a left-and-right pair of front wheels 3 and a left-and-right pair of rear wheels 4.

The vehicle body 2 of this type includes a frameless body made of, for example, high-tensile steel. The vehicle body 2 elastically deforms according to an external force applied at the time of traveling and vibrates in, for example, the side-to-side and back-and-forth directions. Examples of the external force that generates vibrations are a force applied to the vehicle body 2 when the front wheels 3 and the rear wheels 4 run on uneven spots and a force received from vibrations from an engine (not shown).

To damp the unwanted vibrations of the vehicle body 2, the vehicle 1 according to the present preferred embodiment includes a first vibration damping device 11 for a vehicle body provided in the front portion of the vehicle body 2 and a second vibration damping device 12 for a vehicle body provided in the rear portion of the vehicle body 2. Identical devices may be used as the first vibration damping device 11 for a vehicle body and the second vibration damping device 12 for a vehicle body.

One end (the end on the left side in FIG. 1) of each of the first vibration damping device 11 for a vehicle body and the second vibration damping device 12 for a vehicle body is mounted and supported at a predetermined first mounting position P1 of the vehicle body 2, and the other end is mounted and supported at a predetermined second mounting position P2. Note that even if the first mounting position P1 and the second mounting position P2 have a difference of elevation, the same effect is obtained.

The first mounting position P1 and the second mounting position P2 are preferably the upper ends of a left-and-right pair of suspension towers 13 and 14 that defines a portion of a suspension system, as shown in FIG. 1. That is, one end (the end on the left side of the vehicle body) of each of the first vibration damping device 11 for a vehicle body and the second vibration damping device 12 for a vehicle body according to the present preferred embodiment is mounted on the suspension tower 13 located on the left side of the vehicle body. The other end is mounted on the suspension tower 14 located on the right side of the vehicle body. Note that the suspension towers 13 and 14 shown in FIG. 1 are illustrated not at the actual positions but behind the front wheels 3 or the rear wheels 4.

Each of the first vibration damping device 11 for a vehicle body and the second vibration damping device 12 for a vehicle body includes a plurality of connected elements. The plurality of elements are, for example, a hydraulic damper 15 located on one end side (the left side in FIG. 1) in the longitudinal direction, an extension joint 16 located on the other end side, and an operation device 17 located between these elements. The operation device 17 is used to change the magnitude of the damping force generated by the vibration damping devices 11 and 12. The hydraulic damper 15, the extension joint 16, and the operation device 17 are connected in a state in which they are arranged in the longitudinal direction, and details will be described below. In the first vibration damping device 11 for a vehicle body and the second vibration damping device 12 for a vehicle body according to the present preferred embodiment, these members preferably are arranged on the same axis.

One end of the hydraulic damper 15 according to the present preferred embodiment includes a hydraulic cylinder 18 (to be described below), as shown in FIGS. 2A and 2B. This one end is the end mounted on the suspension tower 13 on the left side of the vehicle body. One end of the hydraulic cylinder 18 is mounted and supported at the first mounting position P1 (the suspension tower 13 on the left side of the vehicle body).

The other end of the hydraulic damper 15 includes a piston rod 19 (to be described below). The piston rod 19 slidably extends through the other end of the hydraulic cylinder 18. One end of the piston rod 19 is inserted into the hydraulic cylinder 18. The other end of the piston rod 19 is supported at the second mounting position P2 (the suspension tower 14 on the right side of the vehicle body) via the operation device 17 and the extension joint 16.

As shown in FIGS. 2A and 2B, the hydraulic cylinder 18 includes an oil chamber 21 filled with hydraulic oil, and includes a lid member 23, a guide member 24, and a cylinder tube 22. The lid member 23 defines one end of the hydraulic cylinder 18, and blocks one end (the left end in FIGS. 2A and 2B) of the cylinder tube 22. The guide member 24 defines the other end of the hydraulic cylinder 18, and blocks the other end of the cylinder tube 22 and simultaneously slidably supports the piston rod 19.

Figure 6:
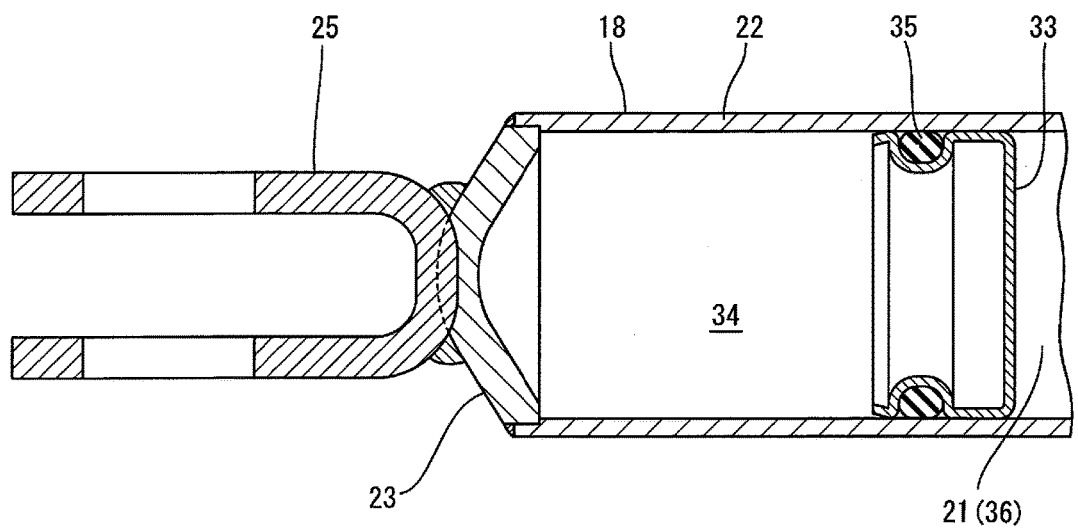
FIG. 6 is an enlarged sectional view showing the free piston portion of the hydraulic damper according to the first preferred embodiment of the present invention.

As shown in FIG. 6, the lid member 23 is fitted in the cylinder tube 22 and welded, for example, to the cylinder tube 22 in this state. A mounting member 25 having a U-shaped section is welded, for example, to the lid member 23. The mounting member 25 is fixed, by a fixing bolt (not shown), to a mounting bracket 26 (see FIG. 2B) provided on the upper end of the suspension tower 13 located on the left side of the vehicle body. The upper end of the suspension tower 14 located on the right side of the vehicle body is connected, via the mounting bracket 26, to the mounting member 25 on the side of the extension joint 16.

That is, each of the first vibration damping device 11 for a vehicle body and the second vibration damping device 12 for a vehicle body is mounted on the suspension towers 13 and 14 via the mounting members 25 and the mounting brackets 26. Each mounting bracket 26 has a rigidity that transmits the vibrations of the vehicle body 2 to the side of the hydraulic cylinder 18. The vibration damping device for a vehicle body according to the present preferred embodiment also includes a device provided with a rigid structure that transmits vibrations between the first mounting position P1 and the second mounting position P2.

Figure 3:
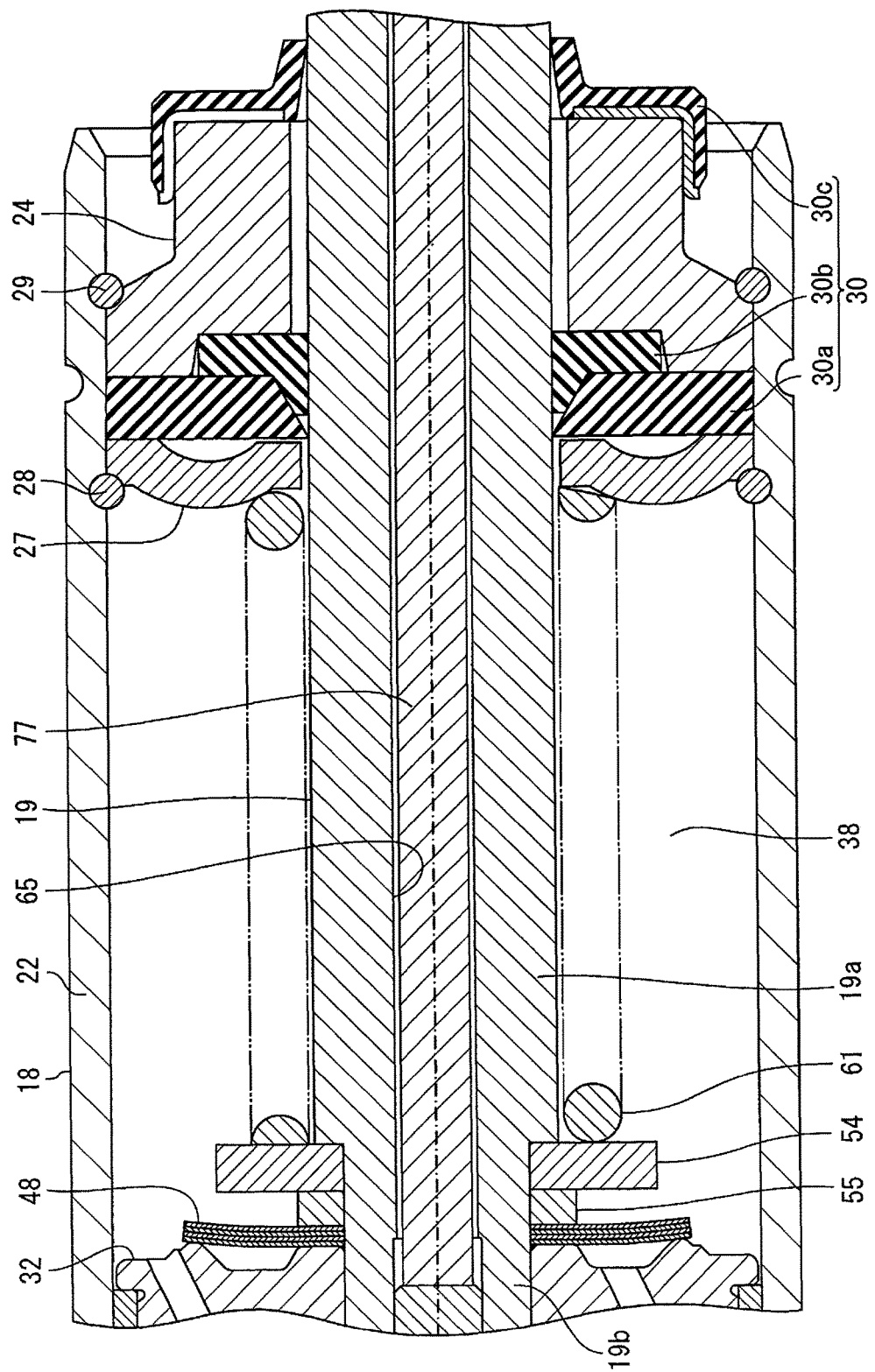
FIG. 3 is an enlarged sectional view showing the piston rod penetrating portion of a hydraulic damper according to the first preferred embodiment of the present invention.

As shown in FIG. 3, the guide member 24 is fitted in the other end of the cylinder tube 22 and fixed to the cylinder tube 22 by circlips 28 and 29 together with a first spring seat 27. Seal members 30 that seal the portion that the piston rod 19 extends through are provided on the two ends of the guide member 24. The seal members 30 include a first seal member 30a and a second seal member 30b which are located on the side of the oil chamber 21, and a third seal member 30c located outside the oil chamber 21.

As shown in FIGS. 2A and 2B, a first piston 31, a second piston 32, and a free piston 33 are slidably fitted in the cylinder tube 22. These pistons 31 to 33 preferably include a circular section that is slidably fitted in the cylinder tube 22. The first piston 31 and the second piston 32 according to the present preferred embodiment are preferably identical.

Figure 4:
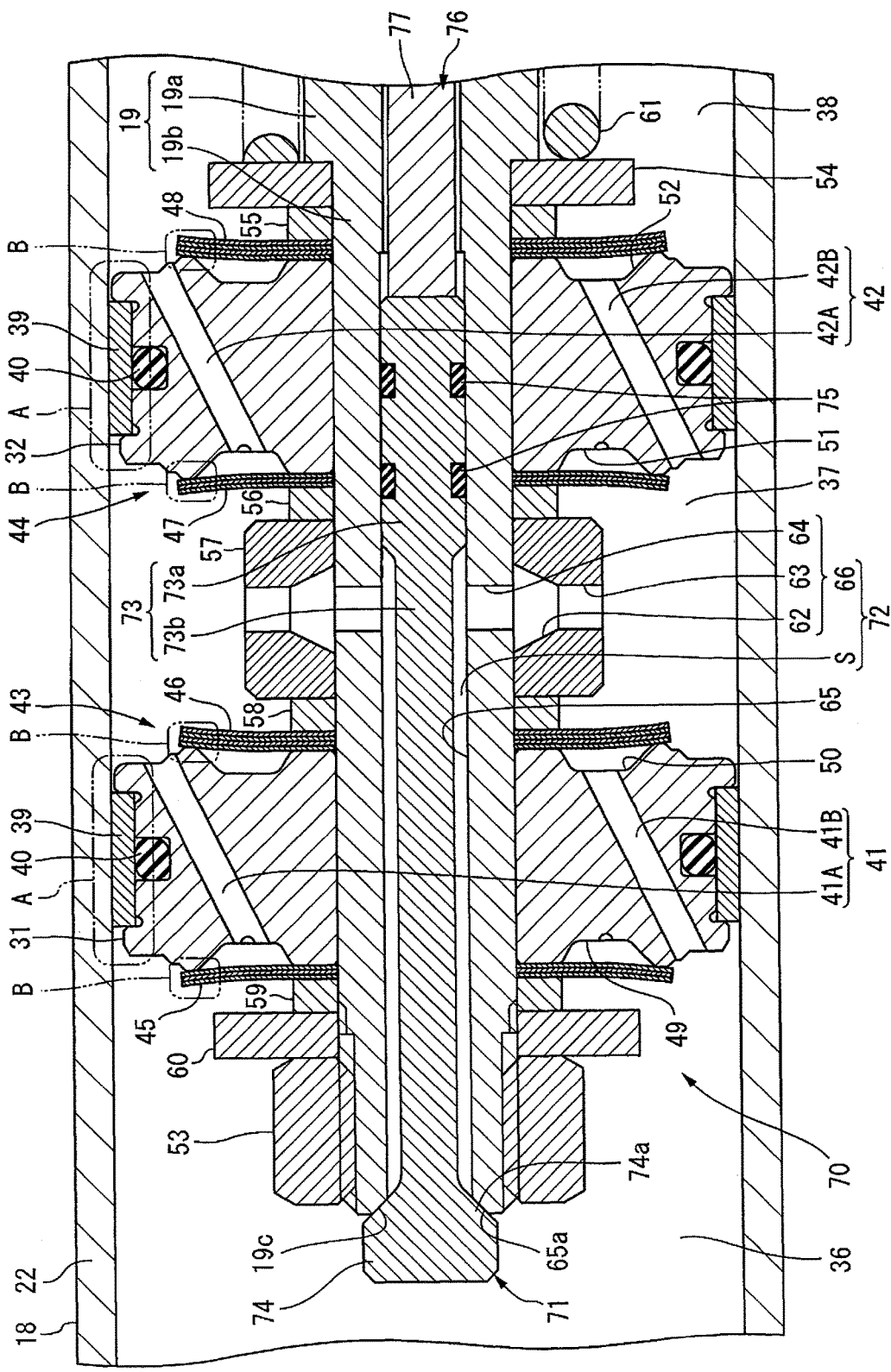
FIG. 4 is an enlarged sectional view showing the piston portion of the hydraulic damper according to the first preferred embodiment of the present invention, which illustrates a state in which an on-off valve is closed.
Figure 5:
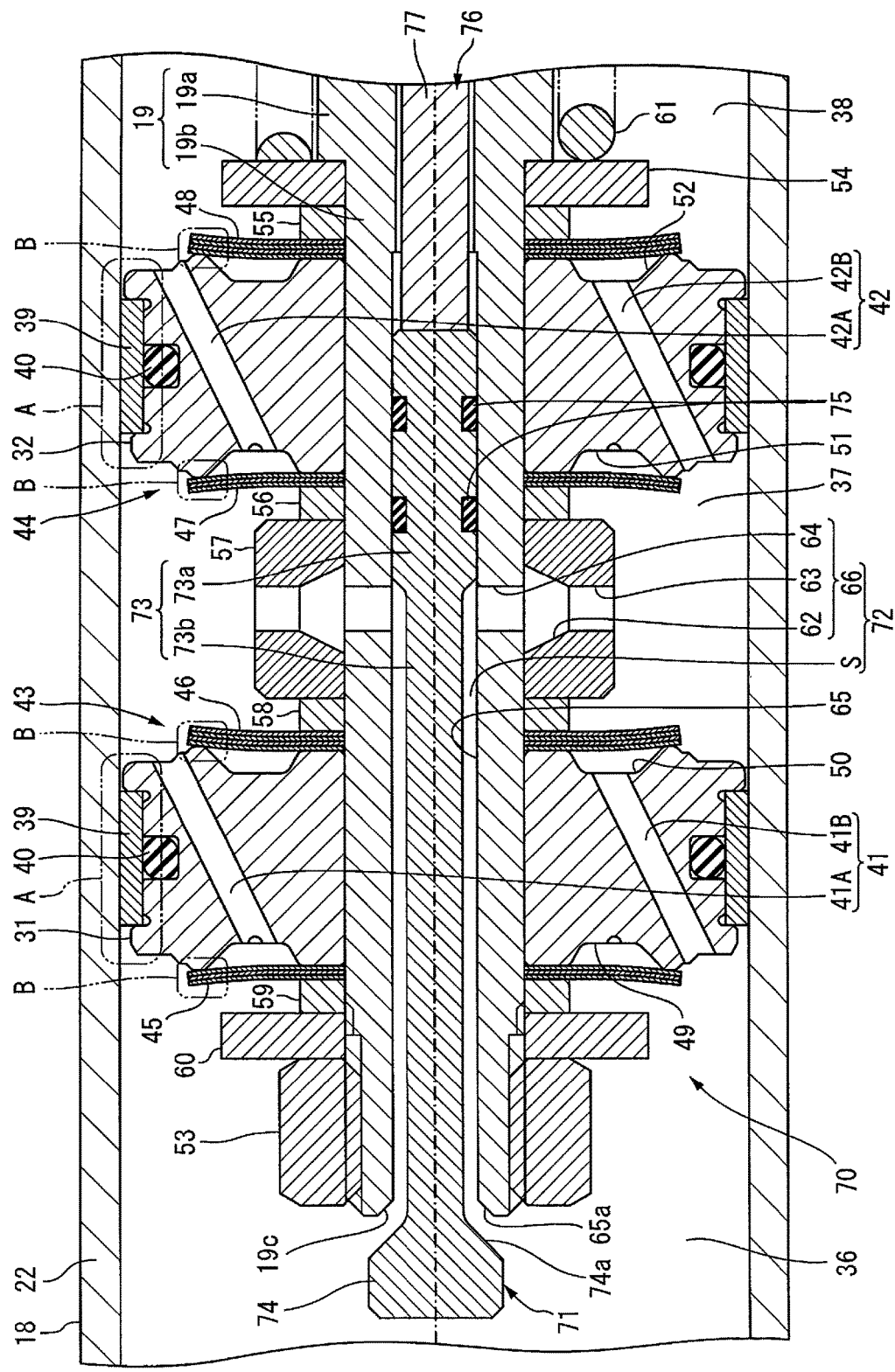
FIG. 5 is an enlarged sectional view showing the piston portion of the hydraulic damper according to the first preferred embodiment of the present invention, which illustrates a state in which the on-off valve is open.

As shown in FIGS. 4 and 5, the first piston 31 is fixed to one end of the piston rod 19 together with a plurality of elements to be described below. The second piston 32 is fixed between the first piston 31 and the guide member 24 (the other end of the hydraulic cylinder 18) in the piston rod 19 together with a plurality of elements to be described below. The free piston 33 is arranged between the first piston 31 and the lid member 23 (one end of the hydraulic cylinder 18), as shown in FIGS. 2A and 2B.

As shown in FIG. 6, the free piston 33 divides the interior of the hydraulic cylinder 18 into the oil chamber 21 and a gas chamber 34. An O-ring 35 is mounted on the outer surface of the free piston 33. The O-ring 35 seals the portion between the gas chamber 34 and the oil chamber 21. The gas chamber 34 is filled with $N_2$ gas of a predetermined pressure. For this reason, the hydraulic oil in the oil chamber 21 is pressurized by the free piston 33.

As shown in FIGS. 2A and 2B, the first piston 31 divides the oil chamber 21 into a first oil chamber 36 and a second oil chamber 37. The first oil chamber 36 is between the free piston 33 and the first piston 31.

The second piston 32 divides the oil chamber 21 into the second oil chamber 37 and a third oil chamber 38. The second oil chamber 37 is between the first piston 31 and the second piston 32. The third oil chamber 38 is between the second piston 32 and the guide member 24 (the other end of the hydraulic cylinder 18).

As shown in FIGS. 4 and 5, a bearing 39 and an O-ring 40 are provided on the outer surface of each of the first piston 31 and the second piston 32. The bearing 39 smoothens the sliding between the first piston 31 or the second piston 32 and the cylinder tube 22. The O-ring 40 biases the bearing 39 outward in the radial direction so as to increase the diameter, and also seals the gap between the inner surface of the bearing 39 and the outer surface of the first piston 31 or the second piston 32.

The first piston 31 is provided with a first hydraulic oil passage 41 including a tension-side passage 41A and a compression-side passage 41B. The second piston 32 is provided with a second hydraulic oil passage 42 including a tension-side passage 42A and a compression-side passage 42B.

The tension-side passages 41A and 42A and the compression-side passages 41B and 42B are provided with valve bodies 45 to 48 of a first leaf valve mechanism 43 and a second leaf valve mechanism 44, and details will be described below. The valve bodies 45 to 48 regulate the hydraulic oil flowing direction to one direction. The portions where the tension-side passages 41A and 42A and the compression-side passages 41B and 42B extend through the first piston 31 and the second piston 32 include a plurality of portions alternately provided at appropriate intervals in the circumferential direction of the first piston 31 and the second piston 32.

When the hydraulic damper 15 expands, the hydraulic oil flows through the tension-side passages 41A and 42A. When the hydraulic damper 15 contracts, the hydraulic oil flows through the compression-side passages 41B and 42B.

The end of the tension-side passage 41A of the first piston 31 on the side of the first oil chamber 36 includes an annular first concave portion 49. The end of the compression-side passage 41B of the first piston 31 on the side of the second oil chamber 37 includes an annular second concave portion 50.

The end of the tension-side passage 42A of the second piston 32 on the side of the second oil chamber 37 includes an annular third concave portion 51. The end of the compression-side passage 42B of the second piston 32 on the side of the third oil chamber 38 includes an annular fourth concave portion 52.

One end of the piston rod 19 extends through the axes of the first piston 31 and the second piston 32. As shown in FIGS. 3 and 4, the piston rod 19 includes a large diameter portion 19a that extends through the guide member 24, and a small diameter portion 19b connected to one end of the large diameter portion 19a. As shown in FIG. 4, the first piston 31, the second piston 32, and other elements to be described below are overlaid in the axial direction and fastened to the small diameter portion 19b by a fixing nut 53, for example.

A second spring seat 54, a first spacer 55, and the valve body 48 of the second leaf valve mechanism 44 to be described below are provided on the small diameter portion 19b between the second piston 32 and the large diameter portion 19a sequentially from the side of the large diameter portion.

The valve body 47 of the second leaf valve mechanism 44, a second spacer 56, a communicating member 57, a third spacer 58, and the valve body 46 of the first leaf valve mechanism 43 are provided between the second piston 32 and the first piston 31 sequentially from the side of the second piston 32. The valve body 45 of the first leaf valve mechanism 43, a fourth spacer 59, and a washer 60 are provided between the first piston 31 and the fixing nut 53 sequentially from the side of the first piston 31. The first spacer 55, the second spacer 56, the third spacer 58, and the fourth spacer 59 preferably are identical.

As shown in FIG. 3, the second spring seat 54 located between the second piston 32 and the large diameter portion 19a of the piston rod 19 receives the spring force of a compression coil spring 61. The compression coil spring 61 is inserted between the second spring seat 54 and the first spring seat 27 located on the side of the guide member 24 in a compressed state.

The piston rod 19 extends through the center of the compression coil spring 61. The first piston 31 and the second piston 32 are biased by the spring force of the compression coil spring 61 in a direction (leftward in FIG. 3) in which the hydraulic damper 15 is contracted.

The compression coil spring 61 cancels the force (gas reaction force) in the axial direction, which acts on the piston rod 19 due to the pressure receiving area difference between the two surfaces of the first piston 31. The force in the axial direction is generated because the pressure receiving area of the first piston 31 on the side of the second oil chamber 37 is smaller than the pressure receiving area on the side of the first oil chamber 36. The first piston 31 is pressed by the force in the axial direction in a direction in which the hydraulic damper 15 expands.

The free length of the hydraulic damper 15 according to the present preferred embodiment is the length in a state in which the above-described force in the axial direction is canceled by the spring force of the compression coil spring 61 and kept in balance. The spring force of the compression coil spring 61 is adjusted such that the free length matches the mounting size in the vehicle body 2.

When the free length matches the mounting size in the vehicle body 2, mounting in the vehicle body 2 is facilitated, and the initial load upon mounting in the vehicle body 2 becomes zero. Hence, the hydraulic damper 15 expands/contracts quickly and generates a damping force.

The first leaf valve mechanism 43 provided on the first piston 31 and the second leaf valve mechanism 44 provided on the second piston 32 are similar to those used in a shock absorber for a suspension system in a vehicle or the like. The first leaf valve mechanism 43 and the second leaf valve mechanism 44 preferably are identical. The first leaf valve mechanism 43 includes the first hydraulic oil passage 41 (the tension-side passage 41A and the compression-side passage 41B) of the first piston 31, and the valve bodies 45 and 46 that cover the first concave portion 49 and the second concave portion 50, respectively. The second leaf valve mechanism 44 includes the second hydraulic oil passage 42 (the tension-side passage 42A and the compression-side passage 42B) of the second piston 32, and the valve bodies 47 and 48 that cover the third concave portion 51 and the fourth concave portion 52, respectively.

The valve body 45 defines a check valve that closes the first concave portion 49 of the first piston 31. The valve body 46 defines a check valve that closes the second concave portion 50 of the first piston 31. The valve body 47 defines a check valve that closes the third concave portion 51 of the second piston 32. The valve body 48 defines a check valve that closes the fourth concave portion 52 of the second piston 32.

In the present preferred embodiment, the first leaf valve mechanism 43 defines a "first restrictor" and the second leaf valve mechanism 44 defines a "second restrictor".

Each of the valve bodies 45 to 48 preferably includes a plurality of disc-shaped plates. The valve bodies 45 to 48 are mounted on the piston rod 19 in a state in which they are pressed against the outer peripheries of the concave portions 49 to 52 by their own spring forces. That is, the inner surfaces of the valve bodies 45 to 48 are pressed to the piston side by the first spacer 55, the second spacer 56, the third spacer 58, and the fourth spacer 59 provided on the piston rod 19 when the fixing nut 53 is fastened.

The valve bodies 45 to 48 deform when the inner surfaces are pressed to the piston side, and are pressed against the outer peripheries of the concave portions 49 to 52 under a predetermined initial load.

As a result, the valve body 45 of the first piston 31 blocks the opening portion of the tension-side passage 41A on the side of the first oil chamber 36 under the predetermined initial load. The valve body 45 opens when the oil pressure in the second oil chamber 37 is higher than the initial load of the valve body 45.

The valve body 46 of the first piston 31 blocks the opening portion of the compression-side passage 41B on the side of the second oil chamber 37 under the predetermined initial load. The valve body 46 opens when the oil pressure in the first oil chamber 36 is higher than the initial load of the valve body 46.

The valve body 47 of the second piston 32 blocks the opening portion of the tension-side passage 42A on the side of the second oil chamber 37 under the predetermined initial load. The valve body 47 opens when the oil pressure in the third oil chamber 38 is higher than the initial load of the valve body 47.

The valve body 48 of the second piston 32 blocks the opening portion of the compression-side passage 42B on the side of the third oil chamber 38 under the predetermined initial load. The valve body 48 opens when the oil pressure in the second oil chamber 37 is higher than the initial load of the valve body 48.

When the valve bodies 45 to 48 open, and the hydraulic oil flows through the tension-side passages 41A and 42A or the compression-side passages 41B and 42B, the first vibration damping device 11 for a vehicle body and the second vibration damping device 12 for a vehicle body generate a damping force.

The thickness and the number of valve bodies 45 to 48 are determined based on the magnitude of the damping force to be generated by the hydraulic damper 15. When the spring force of the valve bodies 45 to 48 becomes large, the generated damping force becomes large.

The communicating member 57 provided between the first piston 31 and the second piston 32 preferably has a ring shape and is fitted on the piston rod 19. As shown in FIGS. 4 and 5, an annular groove 62 extending in the circumferential direction is provided in the inner surface of the communicating member 57. A plurality of first small holes 63 radially extending through the communicating member 57 are provided in the bottom portion of the annular groove 62.

A plurality of second small holes 64 radially extending through the piston rod 19 are provided in a portion where the communicating member 57 is fitted on the piston rod 19. The plurality of second small holes 64 allow a through hole 65 along the axis of the piston rod 19 to communicate with the outside (the annular groove 62 of the communicating member 57) of the piston rod 19. That is, the through hole 65 in the piston rod 19 communicates with the second oil chamber 37 via a communicating hole 66 defined by the first small holes 63, the annular groove 62, and the second small holes 64.

The through hole 65 of the piston rod 19 defines a portion of a damping force change mechanism 70 that selectively allows the first oil chamber 36 and the second oil chamber 37 to communicate with each other. As shown in FIGS. 3 to 5 and 9, the through hole 65 opens to the end surface of one end of the piston rod 19 and extends toward the other end of the piston rod 19.

The damping force change mechanism 70 includes the through hole 65, an on-off valve 71 provided in the through hole 65, and the like. The on-off valve 71 opens/closes one end of the through hole 65. In a state in which the on-off valve 71 is open, the first oil chamber 36 and the second oil chamber 37 are allowed to communicate with each other by a third hydraulic oil passage 72 defined by a portion of the through hole 65 and the above-described communicating hole 66.

Figure 7:
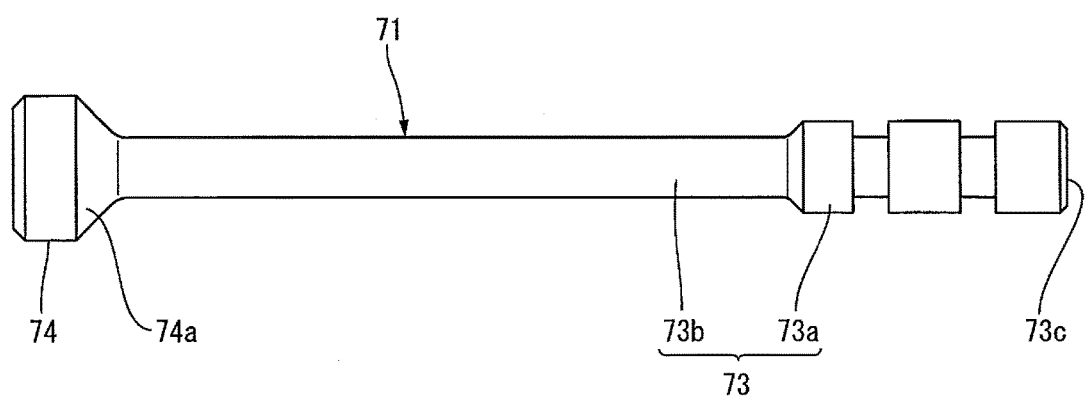
FIG. 7 is a plan view of the on-off valve according to the first preferred embodiment of the present invention.

The on-off valve 71 according to the present preferred embodiment includes a poppet valve inserted in the through hole 65 of the piston rod 19, as shown in FIGS. 4, 5, and 7. The on-off valve 71 includes a shaft portion 73 slidably fitted in the through hole 65, and an expanded diameter portion 74 provided at one end of the shaft portion 73.

The shaft portion 73 includes a sliding portion 73a located at an end on the opposite side of the expanded diameter portion 74, and a small diameter portion 73b located between the sliding portion 73a and the expanded diameter portion 74.

The sliding portion 73a preferably has a columnar shape and is slidably fitted in the through hole 65. Two O-rings 75 are mounted on the sliding portion 73a. The O-rings 75 seal portions between the through hole 65 and the sliding portion 73a. An end surface 73c (see FIG. 7) facing an operation rod 77 of an operation mechanism 76 (to be described below) is provided at an end of the sliding portion 73a on the opposite side of the expanded diameter portion 74.

The diameter of the small diameter portion 73b is smaller than the diameter of the through hole 65. A space S between the small diameter portion 73b and the wall of the through hole 65 defines a portion of the above-described third hydraulic oil passage 72.

As shown in FIG. 4, the small diameter portion 73b has a length that locates the sliding portion 73a on the side of the second piston 32 (the right side in FIG. 4) with respect to the second small holes 64 of the piston rod 19 in a state in which the expanded diameter portion 74 abuts against one end surface 19c of the piston rod 19.

The expanded diameter portion 74 defines the valve body of the poppet valve. The expanded diameter portion 74 projects from the through hole 65 to the first oil chamber 36 and extends outward in the radial direction of the piston rod 19.

An opening portion 65a of the through hole 65 preferably has a tapered shape that gradually increases its diameter toward the first oil chamber 36. The edge of the opening portion 65a with the maximum diameter corresponds to the opening edge of the through hole 65.

The tapered opening portion 65a defines a portion of the end surface 19c of the piston rod 19. The expanded diameter portion 74 preferably has a disc shape including a tapered portion 74a fitted in the opening portion 65a. The diameter of the expanded diameter portion 74 is larger than that of the opening portion 65a and smaller than that of the small diameter portion 19b of the piston rod 19. That is, the expanded diameter portion 74 preferably faces the entire opening edge of the through hole 65 and tightly contacts the one end surface 19c of the piston rod 19.

As shown in FIG. 4, when the expanded diameter portion 74 is fitted in the opening portion 65a of the through hole 65, the on-off valve 71 changes to a fully closed state. In the fully closed state, the expanded diameter portion 74 tightly contacts the entire edge of the opening portion 65a of the through hole 65. As shown in FIG. 5, when the expanded diameter portion 74 separates from the piston rod 19 and wholly enters the first oil chamber 36, the on-off valve 71 changes to a fully opened state. In the fully opened state, the through hole 65 opens to the first oil chamber 36, and the first oil chamber 36 and the second oil chamber 37 communicate with each other via the third hydraulic oil passage 72.

In the present preferred embodiment, a direction in which the on-off valve 71 moves toward the first oil chamber 36 will be referred to as a first direction, and a direction (a direction in which the on-off valve 71 moves to the other end of the piston rod 19) opposite to the first direction will be referred to as a second direction. That is, when the on-off valve 71 moves in the first direction, the third hydraulic oil passage 72 defined by a portion (the space S between the shaft portion 73 and the wall of the through hole 65) of the through hole 65 and the communicating hole 66 is opened. On the other hand, when the on-off valve 71 moves in the second direction, the expanded diameter portion 74 blocks the through hole 65, and the third hydraulic oil passage 72 is closed.

The hydraulic oil in the first oil chamber 36 and the hydraulic oil in the second oil chamber 37 are pressurized by the gas pressure via the free piston 33. For this reason, the oil pressure in the first oil chamber 36 and the oil pressure in the second oil chamber 37 act on the on-off valve 71. The on-off valve 71 is pressed by the oil pressure in the second direction in both the fully closed state shown in FIG. 4 and the fully opened state shown in FIG. 5. This is because the pressure receiving area of the on-off valve 71 on the side of the first oil chamber 36 and the pressure receiving area on the side of the second oil chamber 37 are different. The on-off valve 71 is pressed in the axial direction by a force corresponding to the pressure receiving area difference. The pressure receiving area of the on-off valve 71 on the side of the second oil chamber 37 is smaller than the pressure receiving area on the side of the first oil chamber 36 by an area corresponding to the shaft portion 73 (the shaft portion fitted in the through hole 65) of the on-off valve 71. That is, in a state in which a pressing force is not applied from the operation mechanism 76 (to be described below) to the shaft portion 73, the on-off valve 71 according to the present preferred embodiment is maintained in the fully closed state by the pressure in the gas chamber 34.

The operation mechanism 76 determines the moving direction of the on-off valve 71 via the operation rod 77 facing the on-off valve 71.

The operation rod 77 according to the present preferred embodiment is inserted on the side of the other end of the piston rod 19 with respect to the on-off valve 71 in the through hole 65 so as to be movable in the first direction and the second direction. One end of the operation rod 77 contacts the end surface 73c of the shaft portion 73.

Figure 8:
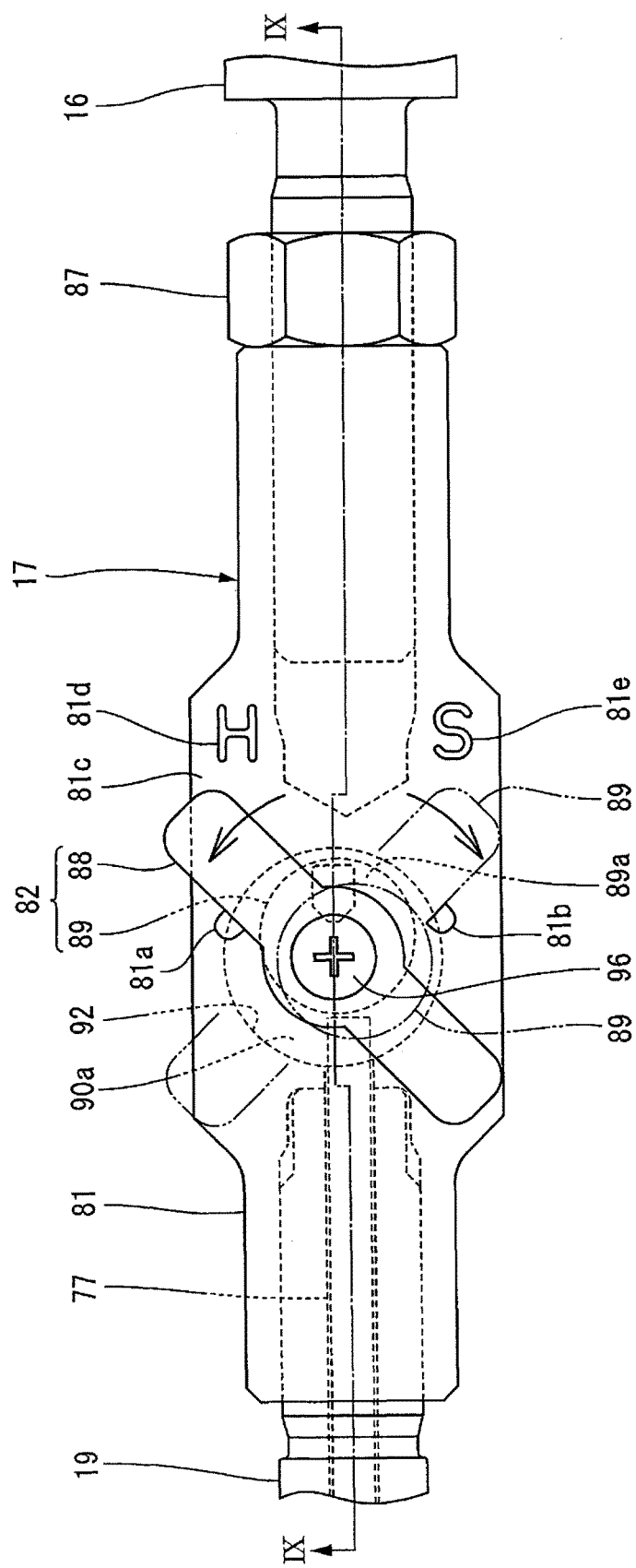
FIG. 8 is a plan view of an operation device according to the first preferred embodiment of the present invention.
Figure 9:
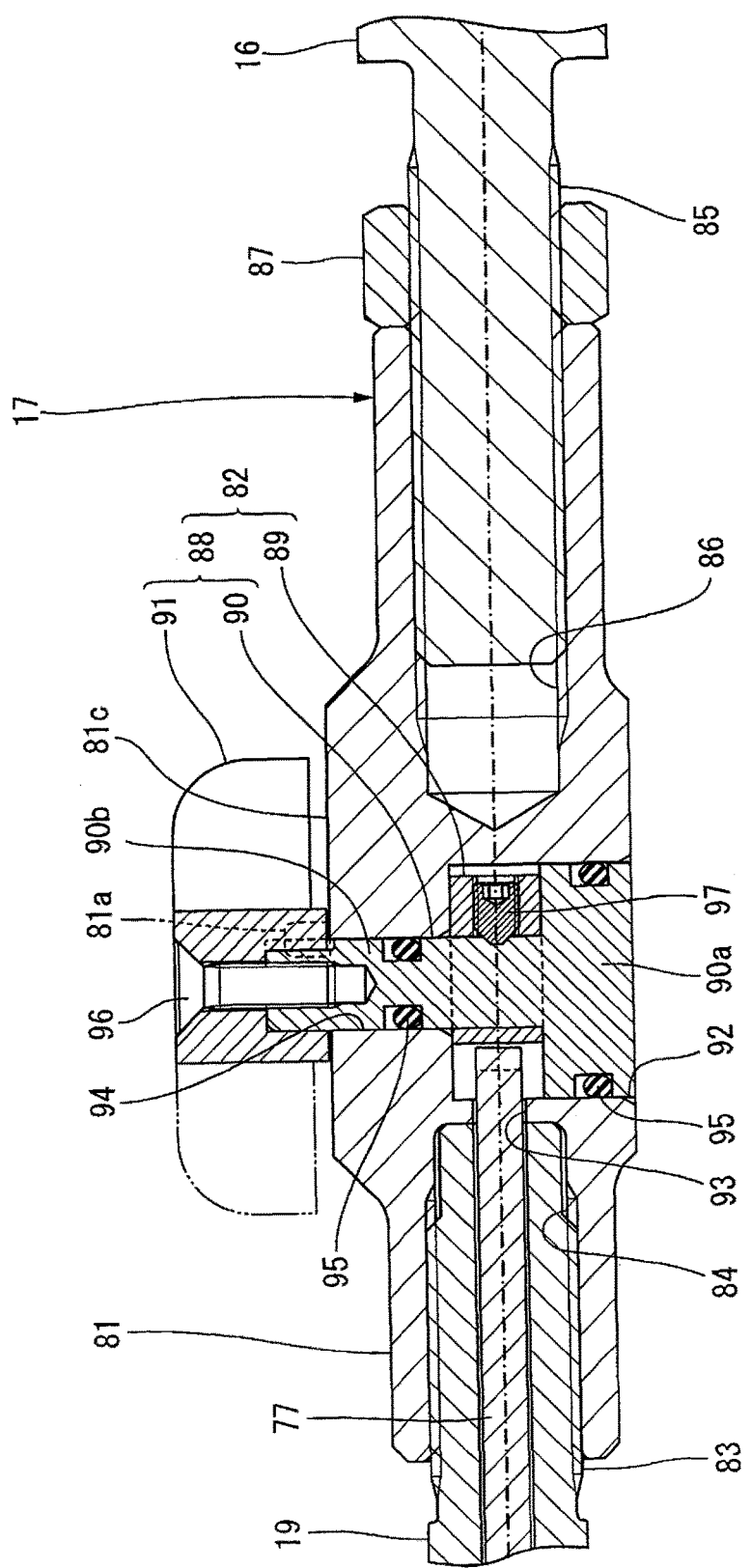
FIG. 9 is a sectional view taken along a line IX-IX in FIG. 8.

The other end (the end on the opposite side of the on-off valve 71) of the operation rod 77 is connected to the operation device 17, as shown in FIGS. 8 and 9. In a state in which the operation force of the operation device 17 is not applied, an atmospheric pressure acts on the other end of the operation rod 77.

The operation device 17 includes a support member 81 that defines a housing, and an operation member 82 pivotally supported by the support member 81. The support member 81 is threadably mounted on the other end of the piston rod 19, and also threadably mounted on one end of the extension joint 16. That is, the support member 81 is located between the extension joint 16 and the other end of the piston rod 19.

The threadably mounted portion between the piston rod 19 and the support member 81 includes a structure in which a male screw 83 on the piston rod 19 threadably engages with a female screw 84 of the support member 81, as shown in FIG. 9. The threadably mounted portion between the extension joint 16 and the support member 81 includes a structure in which a male screw 85 on the extension joint 16 threadably engages with a female screw 86 of the support member 81. A lock nut 87 threadably engages with the male screw 85.

That is, the total length of each of the vibration damping devices 11 and 12 is adjusted by changing the position of the male screw 85 and thus fastening the lock nut 87.

As shown in FIG. 8, a first stopper 81a and a second stopper 81b which define the operation range of the operation member 82 (to be described below) are provided on an upper surface of the support member 81. Each of the first stopper 81a and the second stopper 81b is defined by a portion of an upper surface 81c of the support member 81 projecting from the remaining portion. Symbols 81d and 81e indicating the operation positions of the operation member 82 are provided on the upper surface 81c of the support member 81 with the first stopper 81a and the second stopper 81b. The symbol 81d is the letter H, and the symbol 81e is the letter S. The symbols 81d and 81e are located at positions on one and the other sides in a direction perpendicular or substantially perpendicular to the longitudinal direction of the support member 81.

The operation member 82 includes an operation element 88 manually operable by the passenger, and a cam 89 that pivots integrally with the operation element 88. The operation member 82 converts a pivotal motion into a reciprocating motion and transmits it to the operation rod 77.

As shown in FIG. 9, the operation element 88 according to the present preferred embodiment includes a shaft 90 pivotally supported by the support member 81, and a handle 91 mounted on the shaft 90. The axial direction of the shaft 90 is perpendicular or substantially perpendicular to the axial direction of the piston rod 19. The pivotal motion of the handle 91 is regulated by abutting against the first stopper 81a or the second stopper 81b described above.

The shaft 90 according to the present preferred embodiment includes a large diameter portion 90a preferably having the shape of a disc, and a small diameter portion 90b connected to the axis of the large diameter portion 90a. The large diameter portion 90a is pivotally fitted in a large diameter hole 92 of the support member 81. The depth of the large diameter hole 92 is larger than the thickness of the large diameter portion 90a. The large diameter portion 90a is connected to the through hole 65 of the piston rod 19 by a communicating hole 93.

The small diameter portion 90b is pivotally fitted in a small diameter hole 94 of the support member 81. The distal end of the small diameter portion 90b projects to the outside of the support member 81. O-rings 95 that seal portions with respect to the support member 81 are mounted on the outer surface of the large diameter portion 90a and the outer surface of the small diameter portion 90b. The handle 91 is fixed, by a fixing screw 96, to the end of the small diameter portion 90b projecting to the outside of the support member 81.

As shown in FIG. 8, the cam 89 preferably includes a disc having an eccentricity with respect to the shaft 90 when viewed from the axial direction of the shaft. As shown in FIG. 9, the cam 89 is inserted into the large diameter hole 92 of the support member 81 in a state in which the small diameter portion 90b of the shaft 90 extends through the cam 89, and is fixed to the small diameter portion 90b by a fixing screw 97. That is, the cam 89 partially projects outward in the radial direction from the small diameter portion 90b of the shaft 90.

The operation rod 77 is inserted from the through hole 65 of the piston rod 19 into the large diameter hole 92 via the communicating hole 93 of the support member 81. The operation rod 77 contacts the outer surface of the cam 89 as a cam surface in a state in which the operation rod 77 defines and functions as a cam follower.

The cam 89 converts the pivotal motion of the shaft 90, which occurs when the handle 91 is operated, into a reciprocating motion and transmits it to the other end of the operation rod 77. In a state in which one end of the handle 91 is located near the above-described symbol 81d identified by the letter H and abuts against the first stopper 81a, the cam 89 is located at a first position H indicated by a broken line in FIG. 8. In this state, the pressing amount of the operation rod 77 by the cam 89 is significantly reduced or minimized. The first position H indicates a state in which a projecting portion 89a of the cam 89 is located on the opposite side of the operation rod 77.

When the cam 89 is located at the first position H in this way, the on-off valve 71 moves in the second direction and changes to the fully closed state.

In a state in which one end of the handle 91 is located near the above-described symbol 81e identified by the letter S and abuts against the second stopper 81b, the cam 89 is located at a second position S as indicated by an alternate long and two short dashed line in FIG. 8. When the cam 89 pivots to the second position S indicated by the alternate long and two short dashed line in FIG. 8, the on-off valve 71 moves in the first direction and changes to the fully opened state. The second position S is a position at which the projecting portion 89a of the cam 89 presses the operation rod 77 by a predetermined amount. In the present preferred embodiment, when the shaft 90 rotates by about 90°, for example, the cam 89 moves between the first position H and the second position S.

The operation of the vibration damping devices 11 and 12 having the above-described arrangement will be described next. An operation in a state in which the on-off valve 71 is closed will be described first.

When the interval between the left-and-right pair of suspension towers 13 and 14 changes due to the vibration of the vehicle body 2, the first piston 31 and the second piston 32 in the hydraulic damper 15 move in the axial direction (the side-to-side direction of the vehicle body 2) with respect to the cylinder tube 22.

When the first piston 31 and the second piston 32 start moving with respect to the cylinder tube 22, the hydraulic oil flows into gaps capable of leaking the hydraulic oil in the hydraulic cylinder 18. The gaps capable of leaking the hydraulic oil are gaps through which the hydraulic oil is able to flow among the first to third oil chambers 36 to 38. The gaps capable of leaking the hydraulic oil will be referred to as leak portions hereinafter. The leak portions in the hydraulic damper 15 according to the present preferred embodiment are first leak portions within ranges indicated by alternate long and two short dashed lines A in FIG. 4 and second leak portions within ranges indicated by alternate long and two short dashed lines B in FIG. 4. The first leak portions indicated by the alternate long and two short dashed lines A will simply be referred to as leak portions A, and the second leak portions indicated by the alternate long and two short dashed lines B will simply be referred to as leak portions B hereinafter.

The first leak portions A are gaps defined by clearances between the cylinder tube 22 and the first piston 31 and the second piston 32. The second leak portions B are the gaps between the valve bodies 45 to 48 of the first leaf valve mechanism 43 and the second leaf valve mechanism 44 and the outer peripheries of the concave portions 49 to 52 of the first piston 31 and the second piston 32. The hydraulic oil is viscous. For this reason, immediately after the first piston 31 and the second piston 32 start moving and before the valve bodies 45 to 48 open, the hydraulic oil leaks through the first leak portions A and the second leak portions B to generate a damping force in a magnitude corresponding to the magnitude of the viscous resistance of the hydraulic oil.

Figure 10:
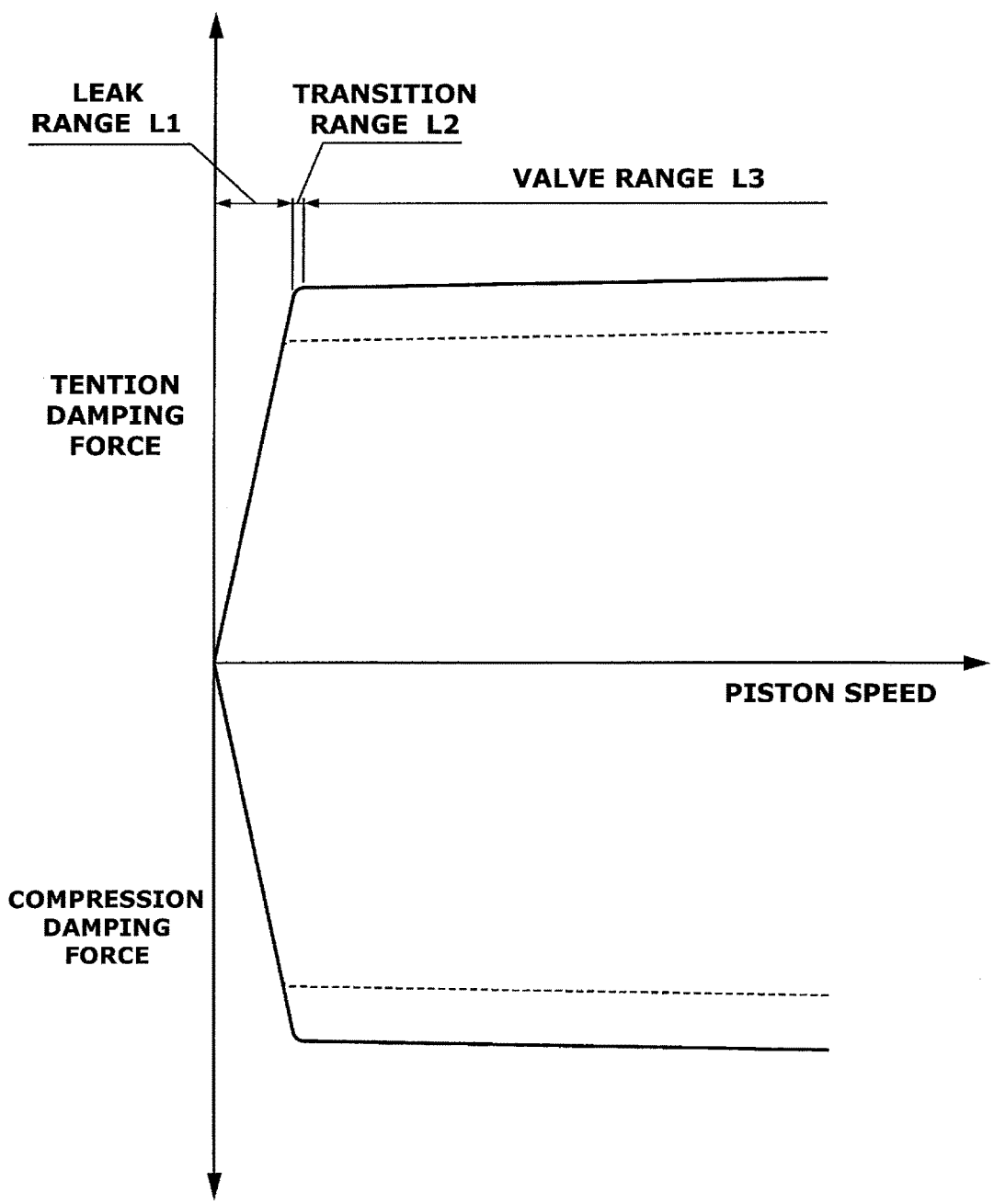
FIG. 10 is a graph showing the relationship between the moving speed of a piston and the magnitude of a damping force.

The magnitude of the damping force immediately after the first piston 31 and the second piston 32 start moving changes almost in proportion to the moving speed of the first piston 31 and the second piston 32, as shown in FIG. 10. The damping force based on the viscous resistance of the hydraulic oil will simply be referred to as a low-speed damping force hereinafter.

The piston speed of the first piston 31 and the second piston 32 after the start of moving changes from a leak range L1 where the low-speed damping force is generated to a transition range L2 and then to a valve range L3, as indicated by a solid line in FIG. 10. The transition range L2 is a speed range where the valve bodies 45 to 48 start opening. The valve range L3 is a speed range where a predetermined damping force is generated by the first leaf valve mechanism 43 and the second leaf valve mechanism 44.

When the on-off valve 71 is closed, the hydraulic oil cannot flow through the third hydraulic oil passage 72. Hence, in this case, the piston speed changes from the transition range L2 to the valve range L3, and accordingly, the hydraulic oil passes through the first leaf valve mechanism 43 and the second leaf valve mechanism 44. The magnitude of the damping force generated by the first vibration damping device 11 for a vehicle body and the second vibration damping device 12 for a vehicle body in this case is the sum of the magnitude of the damping force generated when the hydraulic oil passes through the first leaf valve mechanism 43 and the magnitude of the damping force generated when the hydraulic oil passes through the second leaf valve mechanism 44. After the change to the valve range L3, the ratio of the increase in the magnitude of the damping force becomes considerably small as compared to the ratio of the increase in the moving speed of the first piston 31 and the second piston 32.

On the other hand, when the on-off valve 71 is open, the first oil chamber 36 and the second oil chamber 37 communicate with each other via the third hydraulic oil passage 72. For this reason, the hydraulic oil does not pass through the leak portion A and the leak portion B of the first piston 31 and the first leaf valve mechanism 43. That is, in this case, the hydraulic oil does not pass through the leak portion A and the leak portion B of the second piston 32 and the second leaf valve mechanism 44.

In this case, when the piston moving speed is within the leak range L1, the damping force (low-speed damping force) is generated in a magnitude corresponding to the magnitude of the viscous resistance of the hydraulic oil because the hydraulic oil leaks through the leak portion A and the leak portion B of the second piston 32. The magnitude of the low-speed damping force in this case is the same as that in a case in which the on-off valve 71 is closed. This is because the magnitude of the viscous resistance of the hydraulic oil depends on the minimum sectional area of the passage when the hydraulic oil leaks through the leak portion A or the leak portion B. The minimum sectional area does not change between a state in which the on-off valve 71 is closed and a state in which the on-off valve 71 is open. For this reason, the low-speed damping force does not change between a state in which the on-off valve 71 is closed and a state in which the on-off valve 71 is open.

When the moving speed of the first piston 31 and the second piston 32 increases and reaches the valve range L3 via the transition range L2, the hydraulic oil passes through the second leaf valve mechanism 44 to generate a damping force. That is, as indicated by a broken line in FIG. 10, the magnitude of the damping force generated by the first vibration damping device 11 for a vehicle body and the second vibration damping device 12 for a vehicle body in this case is smaller than the magnitude of the damping force in a case in which the on-off valve 71 is closed, which is indicated by a solid line, in both the tension damping force and the compression damping force. The tension damping force is a damping force generated when the hydraulic damper 15 expands. The compression damping force is a damping force generated when the hydraulic damper 15 contracts.

For this reason, according to the first vibration damping device 11 for a vehicle body and the second vibration damping device 12 for a vehicle body, a relatively large damping force is generated when the on-off valve 71 is closed, and a relatively small damping force is generated when the on-off valve 71 is opened.

Hence, according to the present preferred embodiment, it is possible to provide a vibration damping device for a vehicle body that easily changes the magnitude of the damping force generated in the valve range L3 without changing the low-speed damping force.

The on-off valve 71 according to the present preferred embodiment is biased in the second direction (closing direction) by the oil pressure. The oil pressure that biases the on-off valve 71 is the oil pressure in the first oil chamber 36 and the second oil chamber 37, whose pressure source is the gas in the gas chamber 34, and is based on the difference of the pressure receiving area of the on-off valve 71.

When the on-off valve 71 is pressed by the oil pressure, and the expanded diameter portion 74 tightly contacts the one end surface 19c of the piston rod 19, the first oil chamber 36 and the through hole 65 are completely isolated.

That is, in a state in which the third hydraulic oil passage 72 is closed, the hydraulic oil is prevented from leaking through the portion between the on-off valve 71 and the through hole 65. For this reason, the damping force characteristic in a state in which the on-off valve 71 is closed to generate a large damping force stabilizes.

Hence, according to the present preferred embodiment, it is possible to provide a vibration damping device for a vehicle body that easily changes the magnitude of the damping force and stabilizes the damping force characteristic in a case in which the damping force is large.

The on-off valve 71 according to the present preferred embodiment includes a poppet valve including the shaft portion 73 slidably fitted in the through hole 65, and the expanded diameter portion 74 provided at one end of the shaft portion 73. In the present preferred embodiment, the first direction is the direction in which the on-off valve 71 moves toward the first oil chamber 36. When the on-off valve 71 moves in the first direction, the space S between the shaft portion 73 and the wall of the through hole 65 and the third hydraulic oil passage 72 defined by the communicating hole 66 are opened. When the on-off valve 71 moves in the second direction, the expanded diameter portion 74 blocks the through hole 65, and the third hydraulic oil passage 72 is closed.

The on-off valve 71 is closed as it is pressed by the oil pressure in the first oil chamber 36 and that in the second oil chamber 37 based on the pressure receiving area difference between the two surfaces of the expanded diameter portion 74. For this reason, the first vibration damping device 11 for a vehicle body and the second vibration damping device 12 for a vehicle body according to the present preferred embodiment properly prevents the hydraulic oil from leaking from the on-off valve 71 in the fully closed state because the seal pressure in the fully closed state of the on-off valve 71 is constant. Hence, since a damping force characteristic as designed is attained when the hydraulic oil passes through the first leaf valve mechanism 43 and the second leaf valve mechanism 44, a stable high-performance vibration damping device for a vehicle body is provided.

Each of the vibration damping devices 11 and 12 according to the present preferred embodiment includes the support member 81 mounted on the other end of the piston rod 19, and the operation member 82 pivotally supported by the support member 81. The operation member 82 converts a pivotal motion into a reciprocating motion and transmits it to the operation rod 77.

According to the present preferred embodiment, when the operation member 82 pivots, the operation rod 77 advances in the first direction or retreats in the second direction as it is pressed by the on-off valve 71. That is, when the operation member 82 is operated, the position of the operation rod 77 changes, and the aperture ratio of the on-off valve 71 changes.

For this reason, since the on-off valve 71 defined by a poppet valve is operated by the operation member 82 at a position close to the piston rod 19, the first vibration damping device 11 for a vehicle body and the second vibration damping device 12 for a vehicle body including the operation devices 17 is compact. Hence, when installing the first vibration damping device 11 for a vehicle body and the second vibration damping device 12 for a vehicle body in the vehicle body, the degree of freedom for the installation position is high.

The operation member 82 according to the present preferred embodiment includes the operation element 88 pivotally supported by the support member 81, and the cam 89 that pivots integrally with the operation element 88. The cam 89 contacts the operation rod 77 in a state in which the operation rod 77 defines and functions as a cam follower.

For this reason, when the operation element 88 pivots with respect to the support member 81 together with the cam 89, the operation rod 77 moves, and the aperture ratio of the on-off valve 71 defined by a poppet valve increases or decreases. In the present preferred embodiment, only by rotating the operation element 88 by about 90°, for example, between the position (first position H) at which one end of the handle 91 abuts against the first stopper 81a near the symbol 81d and the position (second position S) at which one end of the handle 91 abuts against the second stopper 81b near the symbol 81e, the state of the on-off valve 71 is quickly switched from the fully closed state to the fully opened state or from the fully opened state to the fully closed state.

Hence, according to the present preferred embodiment, it is possible to provide a vibration damping device for a vehicle body that quickly and smoothly switches between a mode in which a relatively large damping force is generated and a mode in which a relatively small damping force is generated.

The support member 81 according to the present preferred embodiment is located between the other end of the piston rod 19 and the extension joint 16 that extends from the second mounting position P2 to the piston rod 19.

In the present preferred embodiment, the support member 81 is arranged on the same axis as the piston rod 19. Hence, according to the present preferred embodiment, it is possible to provide a more compact vibration damping device for a vehicle body including the operation device 17.

Modification of First Preferred Embodiment

Figure 11:
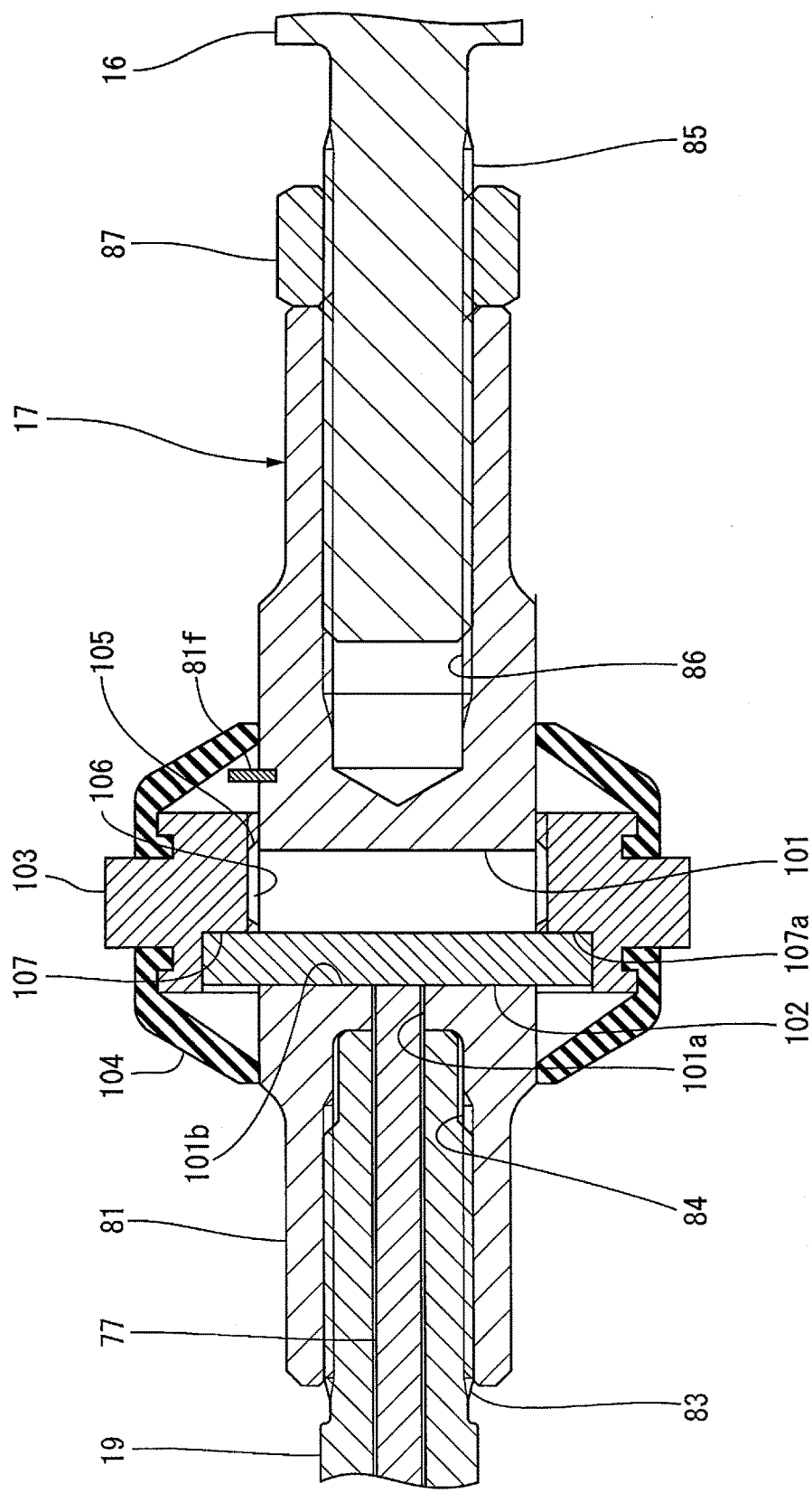
FIG. 11 is a sectional view of the operation device according to a modification of the first preferred embodiment of the present invention.

The operation device may be constructed as shown in FIG. 11. The same reference numerals as described with reference to FIGS. 1 to 10 denote the same or similar members in FIG. 11, and a detailed description thereof will appropriately be omitted.

The support member 81 of the operation device 17 shown in FIG. 11 preferably has a columnar shape elongated in the axial direction of the piston rod 19. The piston rod 19 is threadably mounted on one end of the support member 81, and the extension joint 16 is threadably mounted on the other end.

In a portion of the support member 81 located between the piston rod 19 and the extension joint 16, a through hole 101 extending in the radial direction of the support member 81 is provided, and a stopper pin 81f extends from the support member 81. The through hole 101 preferably has an elliptical opening elongated in the axial direction of the piston rod 19 when viewed from the opening side of the through hole 101. The through hole 101 is connected to the through hole 65 of the piston rod 19 via a communicating hole 101a. The stopper pin 81f regulates the movement of an operation element 103 to be described below, and is located on the opposite side of the piston rod 19 with respect to the through hole 101.

An end of the operation rod 77 according to the present preferred embodiment projects from the piston rod 19, and is inserted into the through hole 101 via the communicating hole 101a. A rod-shaped connecting member 102 is mounted at the end of the operation rod 77. The connecting member 102 is inserted into the through hole 101 while extending in the direction (the vertical direction in FIG. 11) in which the through hole 101 extends through the support member 81. The connecting member 102 is also fitted in the through hole 101 to be movable in the axial direction of the piston rod 19. The two ends of the connecting member 102 project from the through hole 101.

The operation element 103 according to the present preferred embodiment is connected to the projecting end of the connecting member 102. The connecting member 102 reciprocates between an advance position shown in FIG. 11 and a retreat position spaced rightward away from the advance position in FIG. 11 in accordance with the movement of the operation element 103. The advance position is a position at which the connecting member 102 contacts a wall 101b of the through hole 101 on the side of the piston rod 19. The retreat position is a position at which the movement of the operation element 103 is regulated by the stopper pin 81f. The connecting member 102 is biased rightward in FIG. 11 by the gas reaction force transmitted to the operation rod 77 and is always in contact with the operation element 103.

The operation element 103 preferably has an annular shape capable of receiving the support member 81. The outer periphery of the operation element 103 is provided with a cover 104 that is made of rubber, for example, and covers the opening portion of the through hole 101 and a screw portion to be described below.

A female screw 106 threadably engaging with a male screw 105 of the support member 81 and an annular groove 107 engaging with the connecting member 102 are provided in the inner surface of the operation element 103.

The annular groove 107 opens inward in the radial direction of the operation element 103, which preferably has an annular shape, and to one side of the axial direction pointing toward the hydraulic cylinder 18. When the operation element 103 is screwed to the male screw 105 of the support member 81 and moved toward the piston rod 19, the connecting member 102 is pressed by a side wall 107a of the annular groove 107, and the operation rod 77 moves toward the on-off valve 71. Hence, the pivotal motion of the operation element 103 is converted into a reciprocating motion and transmitted to the operation rod 77.

When the connecting member 102 abuts against the wall 101b of the through hole 101 to regulate an additional movement of the operation element 103, the on-off valve 71 changes to the fully opened state. The on-off valve 71 closes when the threadably engaging portion between the operation element 103 and the support member 81 is loosened, and the operation rod 77 and the connecting member 102 are pressed by the gas reaction force and follow the operation element 103. When the operation element 103 abuts against the stopper pin 81f, the on-off valve 71 changes to the fully closed state.

According to the present preferred embodiment, when the operation element 103 pivots with respect to the support member 81 to fasten or loosen the threadably engaging portion, the aperture ratio of the on-off valve 71 changes.

Hence, in the present preferred embodiment, the aperture ratio of the on-off valve 71, which is preferably a poppet valve, is able to be finely adjusted by the screw. It is therefore possible to change the damping force characteristic of the first vibration damping device 11 for a vehicle body and the second vibration damping device 12 for a vehicle body using the on-off valve 71 as an adjustable valve.

Second Preferred Embodiment

An on-off valve and an operation mechanism may be constructed as shown in FIGS. 12 to 18. The same reference numerals as described with reference to FIGS. 1 to 11 denote the same or similar members in FIGS. 12 to 18, and a detailed description thereof will appropriately be omitted. A vibration damping device for a vehicle body according to the present preferred embodiment is different from the vibration damping device for a vehicle body described in the first preferred embodiment only in the on-off valve and the operation mechanism.

Figure 12:
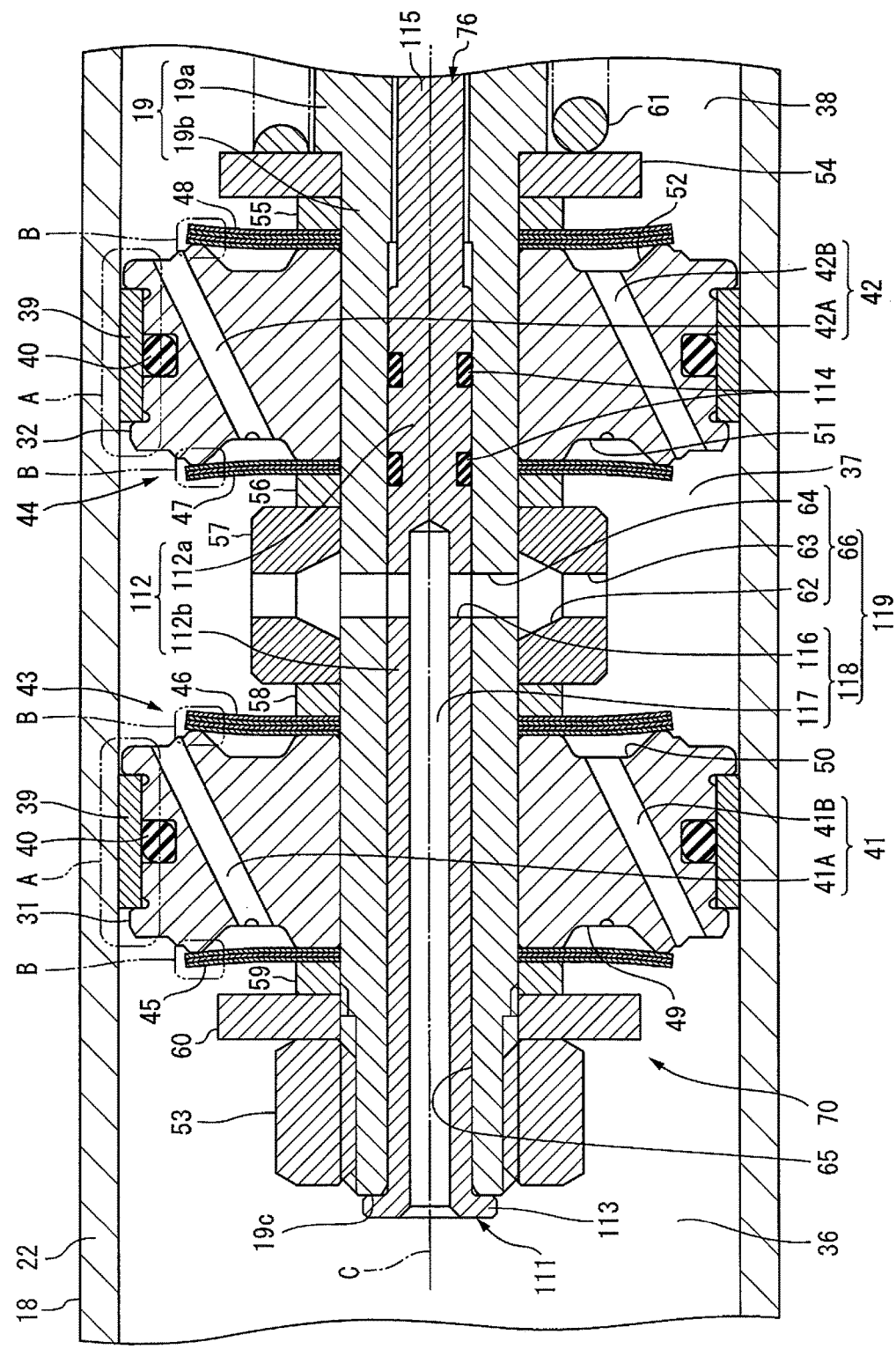
FIG. 12 is an enlarged sectional view showing the piston portion of a hydraulic damper according to a second preferred embodiment of the present invention.

An on-off valve 111 shown in FIG. 12 is of a rotation type that pivots with respect to an axis C of a piston rod 19 as the center. The on-off valve 111 includes a shaft portion 112 inserted into a through hole 65 of the piston rod 19, and an expanded diameter portion 113 provided at one end of the shaft portion 112.

The shaft portion 112 includes a columnar portion 112a having a columnar shape and is located on the axis of a second piston 32, and a tubular portion 112b preferably having a cylindrical shape with a closed end and located between the columnar portion 112a and the expanded diameter portion 113. The columnar portion 112a and the tubular portion 112b are fitted in the through hole 65 to be slidable in the circumferential direction.

Figure 17:
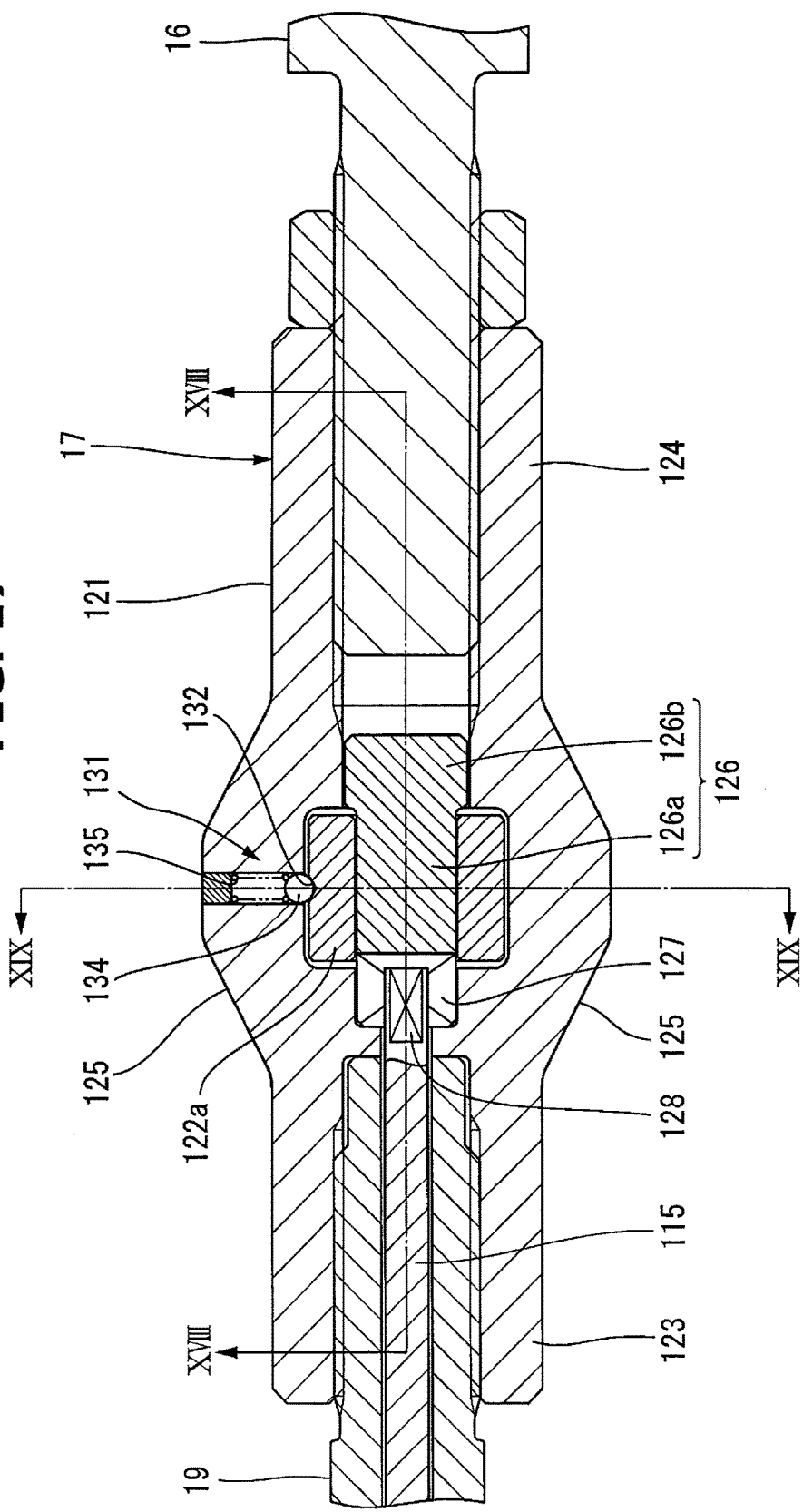
FIG. 17 is a sectional view of an operation device according to the second preferred embodiment of the present invention.

A plurality of O-rings 114 are mounted on the outer surface of the columnar portion 112a to seal portions between the columnar portion 112a and the wall surface of the through hole 65. An operation rod 115 is preferably integral with the columnar portion 112a. As shown in FIG. 17, the operation rod 115 projects from the other end of the piston rod 19 and is connected to an operation device 17 to be described later.

The entire tubular portion 112b is slidably fitted on the wall surface of the through hole 65 in the longitudinal direction. Note that the clearance between the tubular portion 112b and the surface of the hole wall is wider than the clearance between the columnar portion 112a and the surface of the hole wall. The clearances are made different to make the resistance at the time of pivoting of the on-off valve 111 as small as possible.

Figure 13:
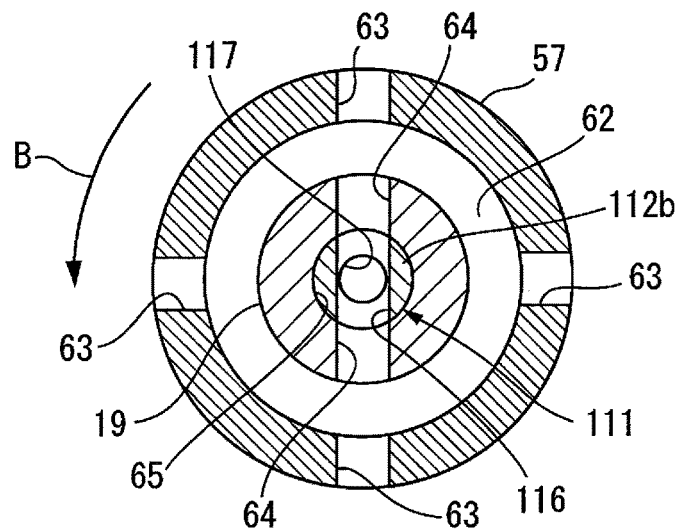
FIG. 13 is an enlarged sectional view showing the on-off valve portion of the hydraulic damper according to the second preferred embodiment of the present invention, which illustrates a state in which the on-off valve is open.

Third small holes 116 that allow the inside of the tubular portion 112b to communicate with second small holes 64 of the piston rod 19 are provided at an end of the tubular portion 112b adjacent to the columnar portion 112a. As shown in FIG. 13, the second small holes 64 are provided at two points of the piston rod 19 in the circumferential direction. The two second small holes 64 according to the present preferred embodiment are located at positions spaced apart by 180° in the circumferential direction. The third small holes 116 preferably have a shape radially extending through the tubular portion 112b.

The third small holes 116 are located at the same positions as the second small holes 64 in the axial direction of the piston rod 19. In other words, the on-off valve 111 has a shape that locates the second small holes 64 and the third small holes 116 at the same positions in the axial direction of the piston rod 19 in a state in which the expanded diameter portion 113 abuts against one end surface 19c of the piston rod 19.

A hollow portion 117 of the tubular portion 112b is provided by drilling, for example, the shaft portion 112 from the expanded diameter portion 113. One end of the hollow portion 117 opens to a first oil chamber 36.

For this reason, an oil hole 118 extending from the first oil chamber 36 to the second small holes 64 (communicating hole 66) is provided in the shaft portion 112.

In the present preferred embodiment, as shown in FIGS. 12 and 13, the on-off valve 111 rotates to a position at which the third small holes 116 are connected to the second small holes 64 to connect the hollow portion 117, the third small holes 116, the second small holes 64, an annular groove 62, and first small holes 63. The position of the on-off valve 111 in the rotation direction at which the third small holes 116 are connected to the second small holes 64 will be referred to as a "fully opened position" hereinafter. That is, when the on-off valve 111 rotates to the fully opened position, the first oil chamber 36 and a second oil chamber 37 communicate with each other via a third hydraulic oil passage 119 including the oil hole 118 defined by the hollow portion 117 and the third small holes 116 and the communicating hole 66 extending from the second small holes 64 to the first small holes 63 via the annular groove 62.

Figure 14:
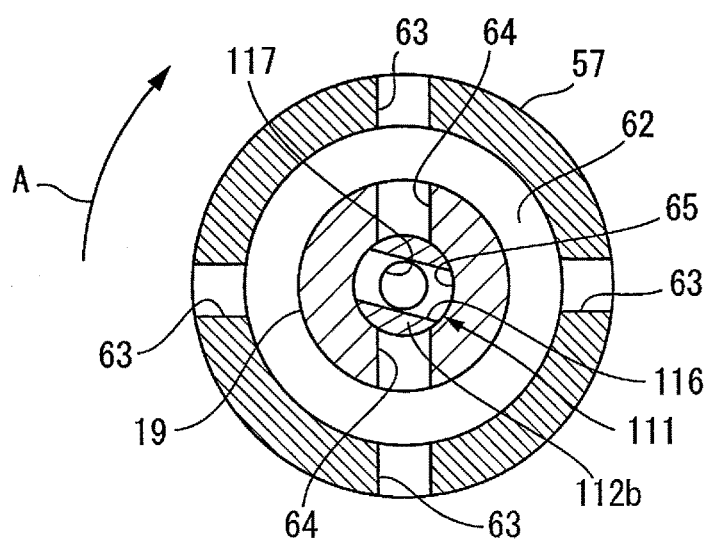
FIG. 14 is an enlarged sectional view showing the on-off valve portion of the hydraulic damper according to the second preferred embodiment of the present invention, which illustrates a state in which the on-off valve is closed.

The on-off valve 111 pivots between the fully opened position shown in FIG. 13 and a fully closed position shown in FIG. 14. The fully closed position is a position at which the third small holes 116 (the openings of the oil hole 118) are blocked by the wall surface of the through hole 65. That is, when the on-off valve 111 rotates from the fully closed position shown in FIG. 14 in the first direction clockwise in FIG. 14, the third hydraulic oil passage 119 defined by the oil hole 118 and the communicating hole 66 is opened. When the on-off valve 111 rotates counterclockwise from the fully opened position shown in FIG. 13 in the second direction in FIG. 13, the openings of the oil hole 118 are blocked by the wall surface of the through hole 65, and the third hydraulic oil passage 119 is closed. The first direction is the direction indicated by an arrow A in FIG. 14, and the second direction is the direction indicated by an arrow B in FIG. 13.

Figure 15:
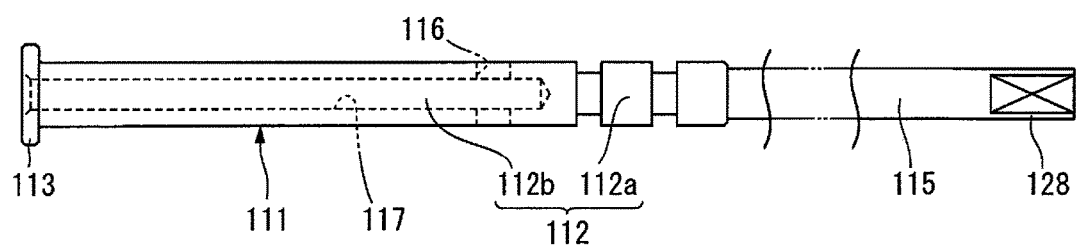
FIG. 15 is a plan view of the on-off valve according to the second preferred embodiment of the present invention.
Figure 16:
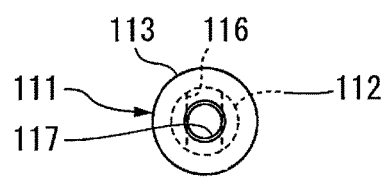
FIG. 16 is a side view of the on-off valve according to the second preferred embodiment of the present invention.

As shown in FIGS. 15 and 16, the expanded diameter portion 113 is preferably a ring-shaped plate. The hole at the center of the expanded diameter portion 113 is the opening portion of the hollow portion 117 described above. The outer diameter of the expanded diameter portion 113 is smaller than the outer diameter of the one end surface 19c of the piston rod 19, as shown in FIG. 12. The one end surface 19c of the piston rod 19 according to the present preferred embodiment is an annular flat surface perpendicular or substantially perpendicular to the axis C of the piston rod 19. That is, the expanded diameter portion 113 according to the present preferred embodiment preferably also has a shape that faces the entire opening edge of the through hole 65 and tightly contacts the one end surface 19c of the piston rod 19.

The on-off valve 111 according to the present preferred embodiment is pressed to the side of the other end of the piston rod 19 when the oil pressure in the first oil chamber 36 and that in the second oil chamber 37 are applied to the expanded diameter portion 113 and the tubular portion 112b. The expanded diameter portion 113 is pressed toward the shaft portion 112 based on the pressure receiving area difference. The tubular portion 112b is pressed when the pressure of the hydraulic oil in the hollow portion 117 is applied to the inner bottom surface. Hence, the on-off valve 111 is held in a state in which the expanded diameter portion 113 is always in tight contact with the piston rod 19. When the expanded diameter portion 113 tightly contacts the one end surface 19c of the piston rod 19, the hydraulic oil is prevented from leaking from a gap corresponding to the clearance between the tubular portion 112b and the wall of the through hole 65.

Figure 18:
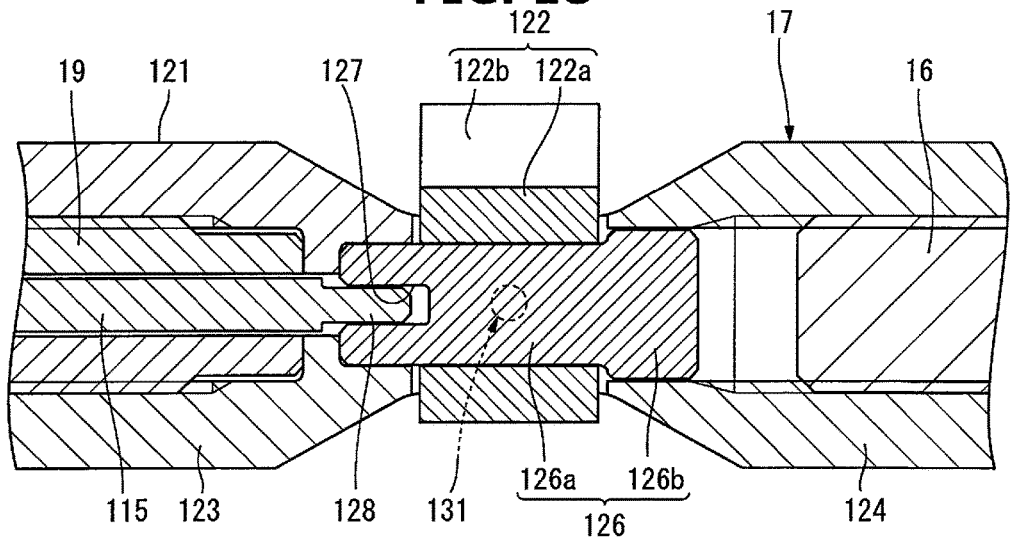
FIG. 18 is a sectional view of the operation device according to the second preferred embodiment of the present invention, in which the cut position corresponds to a position indicated by a line XVII-XVII in FIG. 17.

As shown in FIGS. 17 and 18, the operation device 17 according to the present preferred embodiment includes a support member 121 between the piston rod 19 and an extension joint 16, and an operation element 122 pivotally supported by the support member 121.

Figure 20:
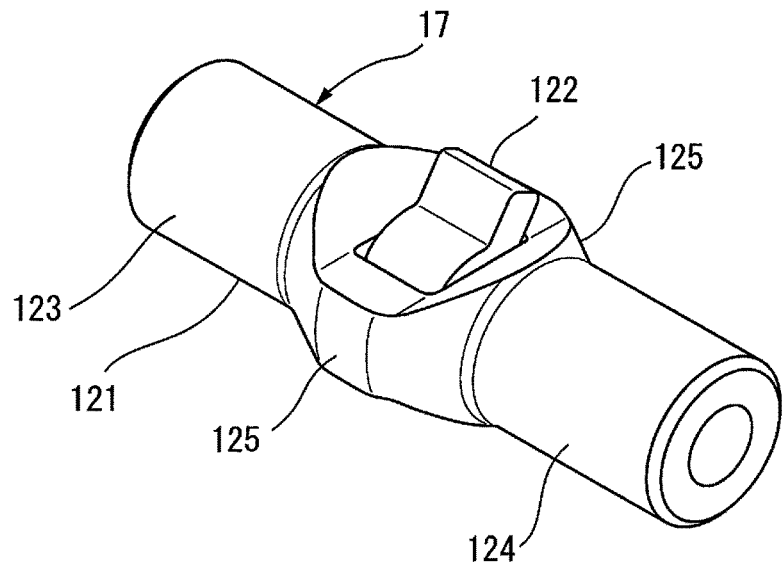
FIG. 20 is a perspective view of the operation device according to the second preferred embodiment of the present invention.
Figure 21:
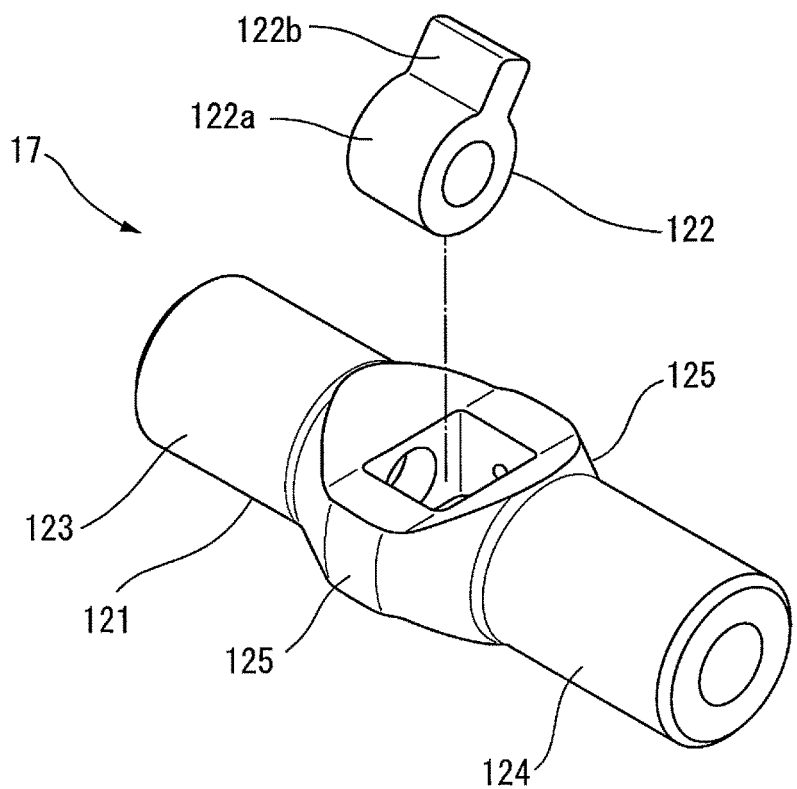
FIG. 21 is an exploded perspective view of the operation device according to the second preferred embodiment of the present invention.

As shown in FIGS. 20 and 21, the support member 121 includes cylindrical portions 123 and 124 located at the two ends, and a pair of arms 125 that connect the cylindrical portions to each other. One cylindrical portion 123 out of the two cylindrical portions 123 and 124 is threadably mounted on the other end of the piston rod 19. The other cylindrical portion 124 is threadably mounted on the extension joint 16.

A drive shaft 126 is provided inside the pair of arms 125 between the cylindrical portions 123 and 124, as shown in FIGS. 17 and 18.

The drive shaft 126 includes a small diameter portion 126a and a large diameter portion 126b, and is pivotally supported by the support member 121 in a state in which the drive shaft 126 is located on the same axis as the piston rod 19. The small diameter portion 126a of the drive shaft 126 is longer than the large diameter portion 126b in the axial direction and arranged between the arms 125.

A pair of planes 127 are provided at the distal end of the small diameter portion 126a. The planes 127 extend parallel or substantially parallel to the axis of the piston rod 19 and face each other while sandwiching the axis located at the center. A plate-shaped connecting piece 128 provided at an end of the operation rod 115 is fitted between the planes 127 and is movable in the axial direction of the piston rod 19. That is, the operation rod 115 pivots integrally with the drive shaft 126 in a state in which a movement in the axial direction with respect to the drive shaft 126 is permitted.

Figure 19:
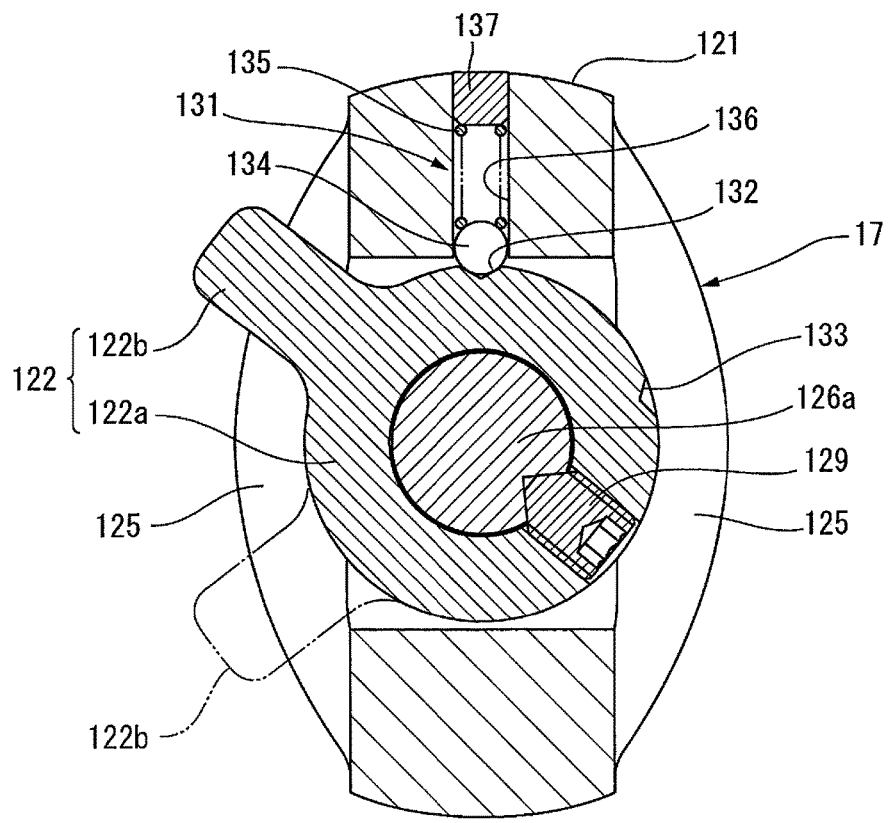
FIG. 19 is a sectional view of the operation device according to the second preferred embodiment of the present invention, in which the cut position corresponds to a position indicated by a line XIX-XIX in FIG. 17.

As shown in FIG. 19, a boss portion 122a of the operation element 122 is mounted on the small diameter portion 126a of the drive shaft 126 in a fitted state. The operation element 122 includes the boss portion 122a, through which the small diameter portion 126a extends, and a lever 122b projecting from the boss portion 122a. The boss portion 122a is fixed to the small diameter portion 126a by a fixing bolt 129, for example. That is, the operation element 122 pivots with respect to the support member 121 about the axis of the piston rod 19 together with the drive shaft 126. When the drive shaft 126 pivots, the operation rod 115 pivots together with the on-off valve 111.

The operation device 17 according to the present preferred embodiment includes a click mechanism 131 to determine the position of the operation element 122 in the rotation direction. The click mechanism 131 includes two concave portions 132 and 133 provided in the outer surface of the boss portion 122a, a ball 134 held by the arm 125 of the support member 121, and a compression coil spring 135 that biases the ball 134 toward the boss portion 122a. The ball 134 and the compression coil spring 135 are inserted in a through hole 136 in the arm 125. The compression coil spring 135 is inserted in a state in which the compression coil spring 135 is compressed between the ball 134 and a plug 137 press-fitted in the opening portion of the through hole 136.

The click mechanism 131 regulates the rotation of the operation element 122 in both a state in which the ball 134 engages with one concave portion 132, as shown in FIG. 19, and a state in which the ball 134 engages with the other concave portion 133.

In the present preferred embodiment, when the ball 134 engages with one concave portion 132, as shown in FIG. 19, the on-off valve 111 changes to the fully opened state. When the lever 122b moves to a position indicated by an alternate long and two short dashed line in FIG. 19, and the ball 134 engages with the other concave portion 133, the on-off valve 111 changes to the fully closed state. The rotation angle of the operation element 122 necessary for the on-off valve 111 to change from the fully opened state to the fully closed state is set to about 75°, for example.

In a first vibration damping device 11 for a vehicle body and a second vibration damping device 12 for a vehicle body each including the on-off valve 111 with the above arrangement and an operation mechanism 76, when the on-off valve 111 rotates to the fully closed position shown in FIG. 14, the third hydraulic oil passage 119 closes, and therefore, a relatively large damping force is generated. When the on-off valve 111 rotates to the fully opened position shown in FIG. 13, the hydraulic oil flows to the third hydraulic oil passage 119 but not to a first leaf valve mechanism 43, and therefore, a relatively small damping force is generated.

Hence, in the present preferred embodiment as well, it is possible to provide a vibration damping device for a vehicle body that is able to easily change the magnitude of the damping force.

The on-off valve 111 according to the present preferred embodiment is pressed by the oil pressure in the first oil chamber 36 and that in the second oil chamber 37, and the expanded diameter portion 113 tightly contacts the one end surface 19c of the piston rod 19. For this reason, the hydraulic oil passage defined by the gap corresponding to the clearance between the tubular portion 112b of the on-off valve 111 and the wall surface of the through hole 65 of the piston rod 19 is closed by the expanded diameter portion 113.

Hence, in a state in which the on-off valve 111 closes, and a large damping force is generated, the hydraulic oil never leaks through the portion between the on-off valve 111 and the through hole 65. The damping force characteristic is thus stabilized in the present preferred embodiment as well.

The on-off valve 111 according to the present preferred embodiment opens/closes by pivoting. For this reason, the fully closed state of the on-off valve 111 is achieved based on the position in the rotation direction without an influence of the magnitude of the operation force. It is therefore possible to properly prevent the hydraulic oil from leaking from the on-off valve 111 in the fully closed state.

Since the damping force characteristic is attained when the hydraulic oil passes through the first leaf valve mechanism 43 and a second leaf valve mechanism 44, a high-performance vibration damping device for a vehicle body is provided.

Each of the first vibration damping device 11 for a vehicle body and the second vibration damping device 12 for a vehicle body according to the present preferred embodiment includes the support member 121 mounted on the other end of the piston rod 19, and the operation element 122 connected to the operation rod 115 in a state in which they pivot integrally. The operation element 122 is supported by the support member 121 to freely pivot in the first direction and the second direction.

According to the present preferred embodiment, the on-off valve 111 is able to pivot and is opened/closed using the operation element 122. For this reason, since the rotation-type on-off valve 111 is operated by the operation element 122 at a position close to the piston rod 19, the first vibration damping device 11 for a vehicle body and the second vibration damping device 12 for a vehicle body including the operation devices 17 is compact. Hence, when installing the first vibration damping device 11 for a vehicle body and the second vibration damping device 12 for a vehicle body in the vehicle body, the degree of freedom for the installation position is high.

The support member 121 according to the present preferred embodiment is between the other end of the piston rod 19 and the extension joint 16. For this reason, since the support member 121 is arranged on the same axis as the piston rod 19 and the extension joint 16, it is possible to provide a more compact vibration damping device for a vehicle body including the operation device 17.

Third Preferred Embodiment

Figure 22:
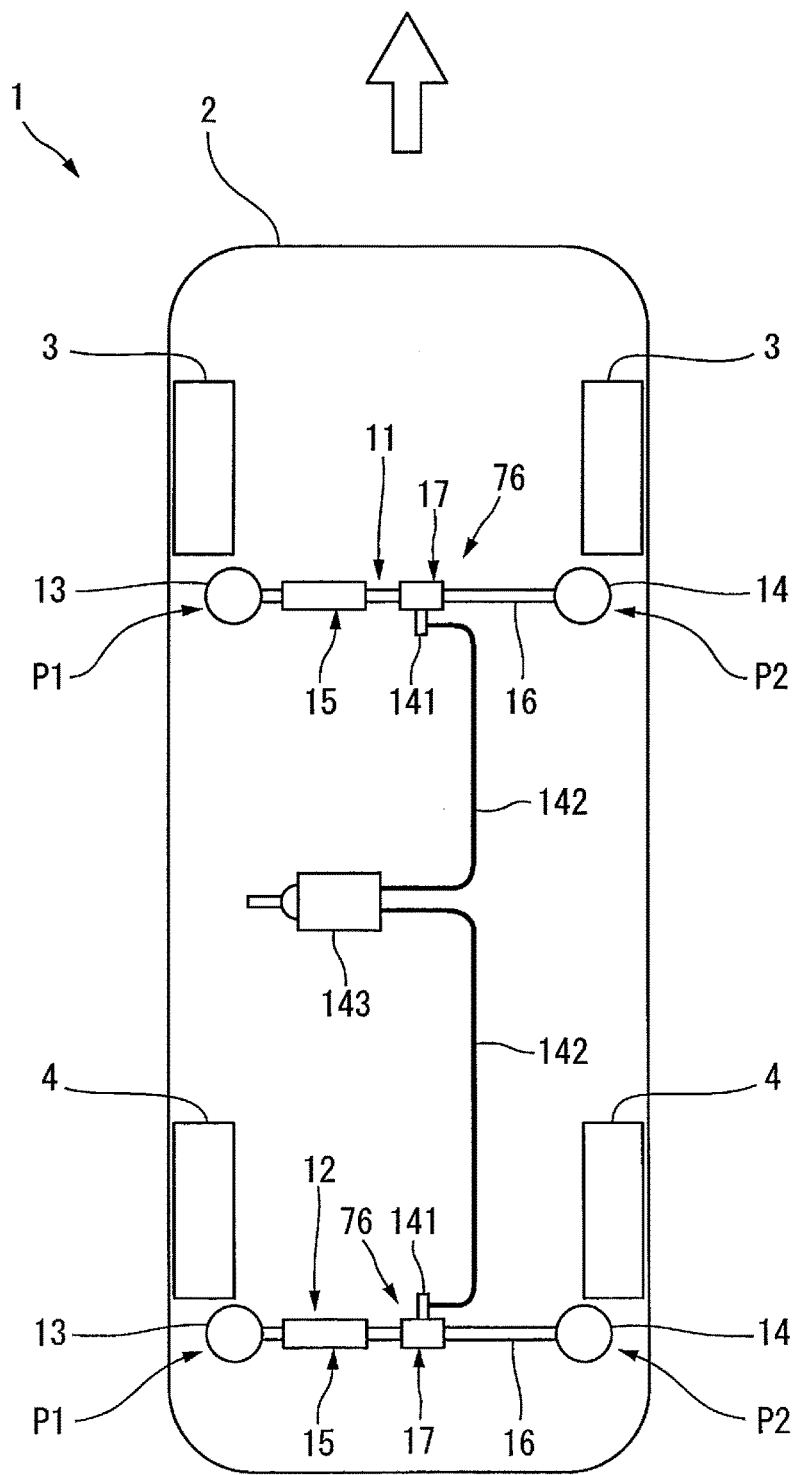
FIG. 22 is a plan view showing the schematic arrangement of a vibration damping device for a vehicle body according to a third preferred embodiment of the present invention, which illustrates a state in which the vibration damping device for a vehicle body is mounted in a vehicle body.

An operation mechanism used to operate an on-off valve may be constructed as shown in FIG. 22. The same reference numerals as described with reference to FIGS. 1 to 21 denote the same or similar members in FIG. 22, and a detailed description thereof will appropriately be omitted.

A vibration damping device for a vehicle body according to the present preferred embodiment is different from the vibration damping device for a vehicle body described in the first preferred embodiment only in the operation mechanism.

An operation element 141 of an operation mechanism 76 shown in FIG. 22 is a pivot-type handle as shown in FIGS. 8 and 9 or a pivot-type lever as shown in FIG. 19. One end of an operation wire 142 is connected to the operation element 141. The other end of the operation wire 142 is connected to an input member 143 spaced apart from a first mounting position P1 or a second mounting position P2 of the vehicle body. Although not illustrated, the input member 143 may be located in a compartment of the vehicle, or in the engine compartment or a luggage compartment.

When the present preferred embodiment is used, the input member 143 is arranged within a range easy to reach for the passenger, and an on-off valve 71 or 111 is operated by remote control. Hence, according to the present preferred embodiment, it is possible to provide a vibration damping device for a vehicle body with the on-off valve 71 or 111 that is easy to operate.

Fourth Preferred Embodiment

Figure 23:
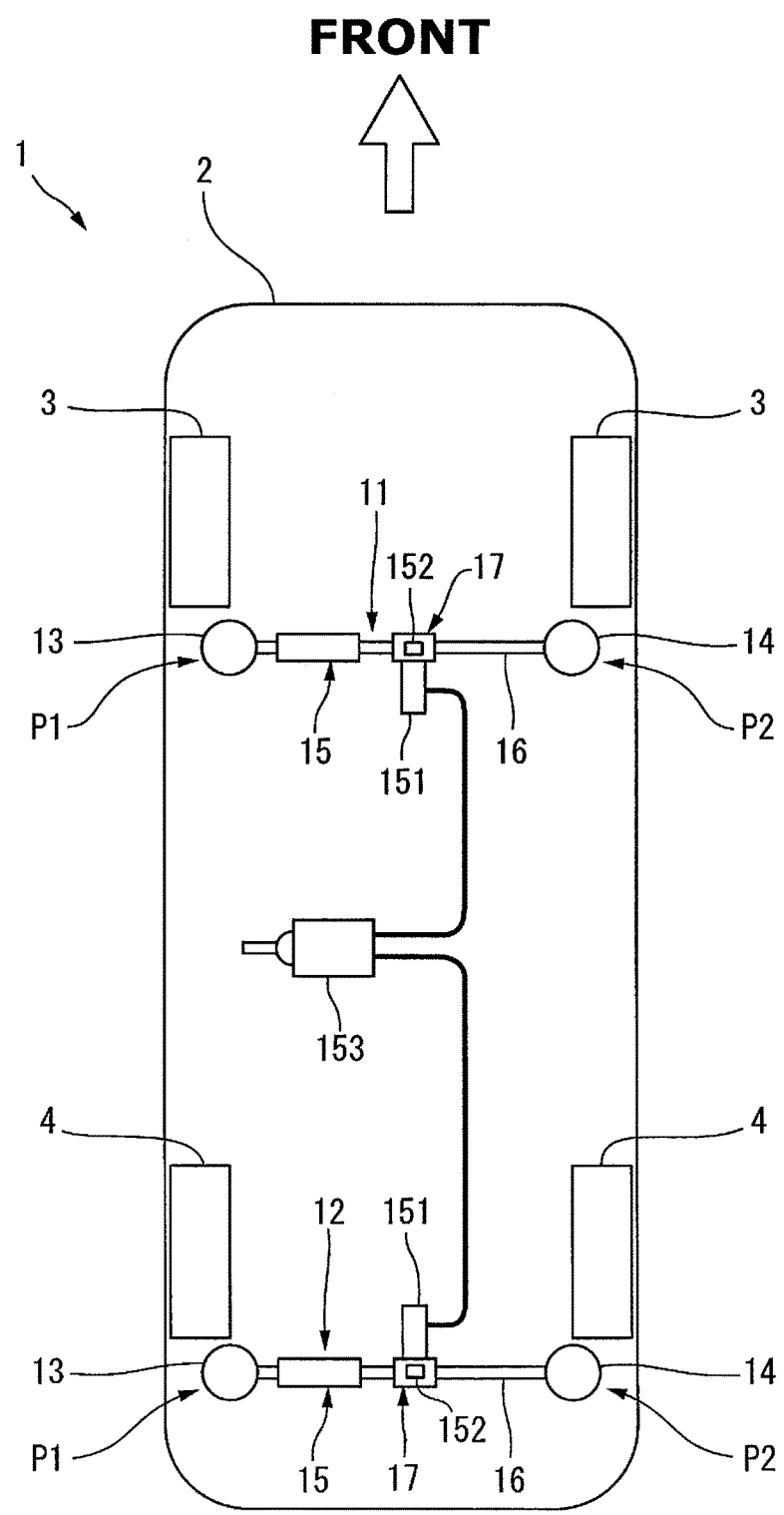
FIG. 23 is a plan view showing the schematic arrangement of a vehicle body vibration damping device according to a fourth preferred embodiment of the present invention, which illustrates a state in which the vibration damping device for a vehicle body is mounted in a vehicle body.

An operation mechanism used to operate an on-off valve may be constructed as shown in FIG. 23. The same reference numerals as described with reference to FIGS. 1 to 21 denote the same or similar members in FIG. 23, and a detailed description thereof will appropriately be omitted.

A vibration damping device for a vehicle body according to the present preferred embodiment is different from the vibration damping device for a vehicle body described in the first preferred embodiment only in the operation mechanism.

An operation device 17 shown in FIG. 23 includes an electric actuator 151. The actuator 151 is connected to an operation element 152 of the operation device 17 and moves the operation element 152 between a position at which an on-off valve 71 or 111 is set in a fully opened state and a position at which the on-off valve 71 or 111 is set in a fully closed state.

As the operation element 152 driven by the actuator 151, a screw actuator as shown in FIG. 11 may be used in addition to a pivot handle as shown in FIGS. 8 and 9 and a pivot lever as shown in FIG. 19.

The actuator 151 is connected to a switch 153 operated by the passenger, and operates when the switch 153 is operated. The switch 153 may be arranged in a compartment of the vehicle or in the engine compartment or a luggage compartment.

In the present preferred embodiment, when the passenger operates the switch 153, the on-off valve 71 or 111 is opened/closed by the power of the actuator 151. Hence, in the present preferred embodiment as well, the on-off valve 71 or 111 is operated by remote control. It is therefore possible to provide a vibration damping device for a vehicle body with the on-off valve 71 or 111 that is easy to operate.

The on-off valve 71 including a poppet valve or the rotation-type on-off valve 111 driven by the actuator 151 maintains the fully closed state without application of an operation force. That is, the on-off valve 71 including a poppet valve is biased in the second direction based on the pressure receiving area difference by the oil pressure in a first oil chamber 36 and that in a second oil chamber 37 and held in the fully closed state. The rotation-type on-off valve 111 is not rotated by the oil pressure because the operation direction and the direction in which the oil pressure acts are different. The on-off valve 111 is held at the fully closed position by the frictional resistance between an expanded diameter portion 113 and one end surface 19c of a piston rod 19.

For this reason, in the present preferred embodiment, when the on-off valve 71 or 111 is in the fully closed state, power supply to the actuator 151 may be cut off. Hence, according to the present preferred embodiment, it is possible to motorize the on-off valve 71 or 111 while minimizing power consumption as much as possible.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vibration damping device for a vehicle body, the vibration damping device comprising:
   a cylinder including a first end supported at a predetermined first mounting position of the vehicle body;
   a piston rod slidably extending through a second end of the cylinder, and including a first end which is inserted into the cylinder and a second end which is supported at a predetermined second mounting position of the vehicle body;
   a first piston through which the piston rod extends, the first piston being fixed to the first end of the piston rod and slidably fitted in the cylinder;
   a second piston through which the piston rod extends, the second piston being fixed on the piston rod between the first piston and the second end of the cylinder and slidably fitted in the cylinder;
   a free piston slidably fitted between the first piston and the first end of the cylinder;
   a gas chamber between the free piston and the first end of the cylinder and filled with a gas of a predetermined pressure;
   a first oil chamber between the free piston and the first piston and filled with a hydraulic oil;
   a second oil chamber between the first piston and the second piston and filled with the hydraulic oil;
   a third oil chamber between the second piston and the second end of the cylinder and filled with the hydraulic oil;
   a first hydraulic oil passage provided in the first piston that allows the first oil chamber and the second oil chamber to communicate with each other;
   a second hydraulic oil passage provided in the second piston that allows the second oil chamber and the third oil chamber to communicate with each other;
   a first restrictor provided in the first hydraulic oil passage;
   a second restrictor provided in the second hydraulic oil passage; and
   a damping force change mechanism provided in the piston rod that selectively allows the first oil chamber and the second oil chamber to communicate with each other; wherein
   the damping force change mechanism includes:
      a through hole opening in an end surface at the first end of the piston rod and extending toward the second end of the piston rod;
      a communicating hole that allows the through hole and the second oil chamber to communicate with each other;
      a third hydraulic oil passage extending from the through hole to the communicating hole, and that allows the first oil chamber and the second oil chamber to communicate with each other;
      an on-off valve movably fitted in the through hole, the on-off valve including a fully opened state by moving to a predetermined first direction so as to open the third hydraulic oil passage, and including a fully closed state by moving to a second direction reverse to the first direction so as to close the third hydraulic oil passage; and
      an operation rod inserted into the piston rod in a side of the second end of the piston rod with respect to the on-off valve in the through hole, the operation rod being movable in the first direction and the second direction so as to determine a moving direction of the on-off valve;
   the on-off valve includes an expanded diameter portion projecting from the through hole into the first oil chamber and extending outward in a radial direction of the piston rod; and
   the expanded diameter portion faces an entire opening edge of the through hole and contacts the end surface of the piston rod.

2. The vibration damping device for a vehicle body according to claim 1, wherein
   the on-off valve includes a poppet valve including a shaft slidably fitted in the through hole, and the expanded diameter portion provided at the first end of the shaft portion;
   the first direction is a direction in which the on-off valve moves to a side of the first oil chamber;
   when the on-off valve moves in the first direction, the third hydraulic oil passage is defined by the communicating hole and a space between the shaft and a wall of the through hole; and when the on-off valve moves in the second direction, the expanded diameter portion blocks the through hole, and the third hydraulic oil passage is closed.

3. The vibration damping device for a vehicle body according to claim 1, wherein
the on-off valve includes:
a shaft slidably fitted in the through hole in a circumferential direction;
the expanded diameter portion provided at a first end of the shaft; and
an oil hole in the shaft and extending from the first oil chamber to the communicating hole; and
the first direction is a direction in which the on-off valve rotates around an axis of the piston rod;
when the on-off valve rotates in the first direction, the third hydraulic oil passage is defined by the oil hole and the communicating hole; and
when the on-off valve rotates in the second direction, an opening of the oil hole is blocked by a wall surface of the through hole, and the third hydraulic oil passage is closed.

4. The vibration damping device for a vehicle body according to claim 1, further comprising:
a support member mounted on the second end of the piston rod; and
an operation member pivotally supported by the support member, and that converts a pivotal motion into a reciprocating motion and transmits the reciprocating motion to the operation rod.

5. The vibration damping device for a vehicle body according to claim 4, wherein the operation member includes:
an operation element threadably engaging with the support member; and
a connecting member connecting the operation element and the operation rod.

6. The vibration damping device for a vehicle body according to claim 4, wherein the operation member includes:
an operation element pivotally supported by the support member; and
a cam that pivots integrally with the operation element; wherein
the cam contacts the operation rod in a state in which the operation rod defines a cam follower.

7. The vibration damping device for a vehicle body according to claim 3, further comprising:
a support member mounted on the second end of the piston rod; and
an operation element connected to the operation rod in a state in which the operation element integrally pivots and supported by the support member to freely pivot in the first direction and the second direction.

8. The vibration damping device for a vehicle body according to claim 5, wherein the operation element is connected, via an operation wire, to an input member spaced apart from one of the first mounting position and the second mounting position of the vehicle body.

9. The vibration damping device for a vehicle body according to claim 5, further comprising an actuator including an electric motor as a power source to drive the operation element.

10. The vibration damping device for a vehicle body according to claim 4, wherein the support member is located between the second end of the piston rod and an extension joint extending from the second mounting position to the piston rod.

* * * * *